United States Patent
Sudo et al.

(10) Patent No.: US 9,754,052 B2
(45) Date of Patent: Sep. 5, 2017

(54) DEVICE FOR ASSISTING WITH SETTING OF MANUFACTURING CONDITIONS FOR SILICA GLASS CRUCIBLE, DEVICE FOR ASSISTING WITH SETTING OF MANUFACTURING CONDITIONS FOR MOLD FOR MANUFACTURING SILICA GLASS CRUCIBLE, DEVICE FOR ASSISTING WITH CONDITION SETTING FOR PULLING UP MONOCRYSTALLINE SILICON USING SILICA GLASS CRUCIBLE

(71) Applicant: SUMCO CORPORATION, Minato-ku, Tokyo (JP)

(72) Inventors: Toshiaki Sudo, Akita (JP); Tadahiro Sato, Akita (JP); Eriko Kitahara, Akita (JP); Shuji Tobita, Akita (JP); Koichi Suzuki, Akita (JP)

(73) Assignee: SUMCO CORPORATION, Tokyo (JP)

( * ) Notice: Subject to any disclaimer, the term of this patent is extended or adjusted under 35 U.S.C. 154(b) by 533 days.

(21) Appl. No.: 14/369,165

(22) PCT Filed: Oct. 31, 2012

(86) PCT No.: PCT/JP2012/078259
§ 371 (c)(1),
(2) Date: Jun. 26, 2014

(87) PCT Pub. No.: WO2013/099433
PCT Pub. Date: Jul. 4, 2013

(65) Prior Publication Data
US 2014/0358270 A1    Dec. 4, 2014

(30) Foreign Application Priority Data

Dec. 31, 2011    (JP) .................................. 2011-290487
Dec. 31, 2011    (JP) .................................. 2011-290488
Dec. 31, 2011    (JP) .................................. 2011-290489

(51) Int. Cl.
*G06F 17/50*    (2006.01)
*C03B 19/09*    (2006.01)
(Continued)

(52) U.S. Cl.
CPC ................ *G06F 17/50* (2013.01); *B01L 3/04* (2013.01); *C03B 19/095* (2013.01); *C30B 15/10* (2013.01);
(Continued)

(58) Field of Classification Search
None
See application file for complete search history.

(56) References Cited

U.S. PATENT DOCUMENTS

2010/0175611 A1*    7/2010    Takanashi ............. C30B 15/203
                                                          117/15

FOREIGN PATENT DOCUMENTS

IT    WO 2011114223 A1 *    9/2011    ........... C23C 14/564
JP    2000-302590 A    10/2000
(Continued)

OTHER PUBLICATIONS

International Search Report (ISR) for PCT/JP2012/078259; dated Dec. 11, 2012.

*Primary Examiner* — Umut Onat
(74) *Attorney, Agent, or Firm* — Law Office of Katsuhiro Arai

(57) ABSTRACT

An apparatus for supporting setting of a manufacturing condition of a vitreous silica crucible includes: an improved property parameter setting unit configured to, if the degree of matching between three-dimensional shapes of simulation data obtained based on an initial property parameter and measurement data falls below a predetermined level, set an (Continued)

improved property parameter such that the degree of matching becomes higher than or equal to the predetermined level, and an improved manufacturing condition data setting unit configured to set a manufacturing condition such that simulation data matching the design data to a degree higher than or equal to a predetermined level is obtained. By using the apparatus, it is possible to manufacture a vitreous silica crucible by rotational molding in such a manner that the three-dimensional shape thereof matches the design data to a high degree.

15 Claims, 19 Drawing Sheets

(51) Int. Cl.
    *C30B 15/10*     (2006.01)
    *C30B 29/06*     (2006.01)
    *B01L 3/04*     (2006.01)

(52) U.S. Cl.
    CPC .......... *C30B 29/06* (2013.01); *G06F 17/5009* (2013.01); *G06F 2217/12* (2013.01); *G06F 2217/16* (2013.01); *Y02P 90/265* (2015.11)

(56) References Cited

FOREIGN PATENT DOCUMENTS

| | | |
|---|---|---|
| JP | 2009-190926 A | 8/2009 |
| JP | 2011-084421 A | 4/2011 |

\* cited by examiner

[FIG.1]
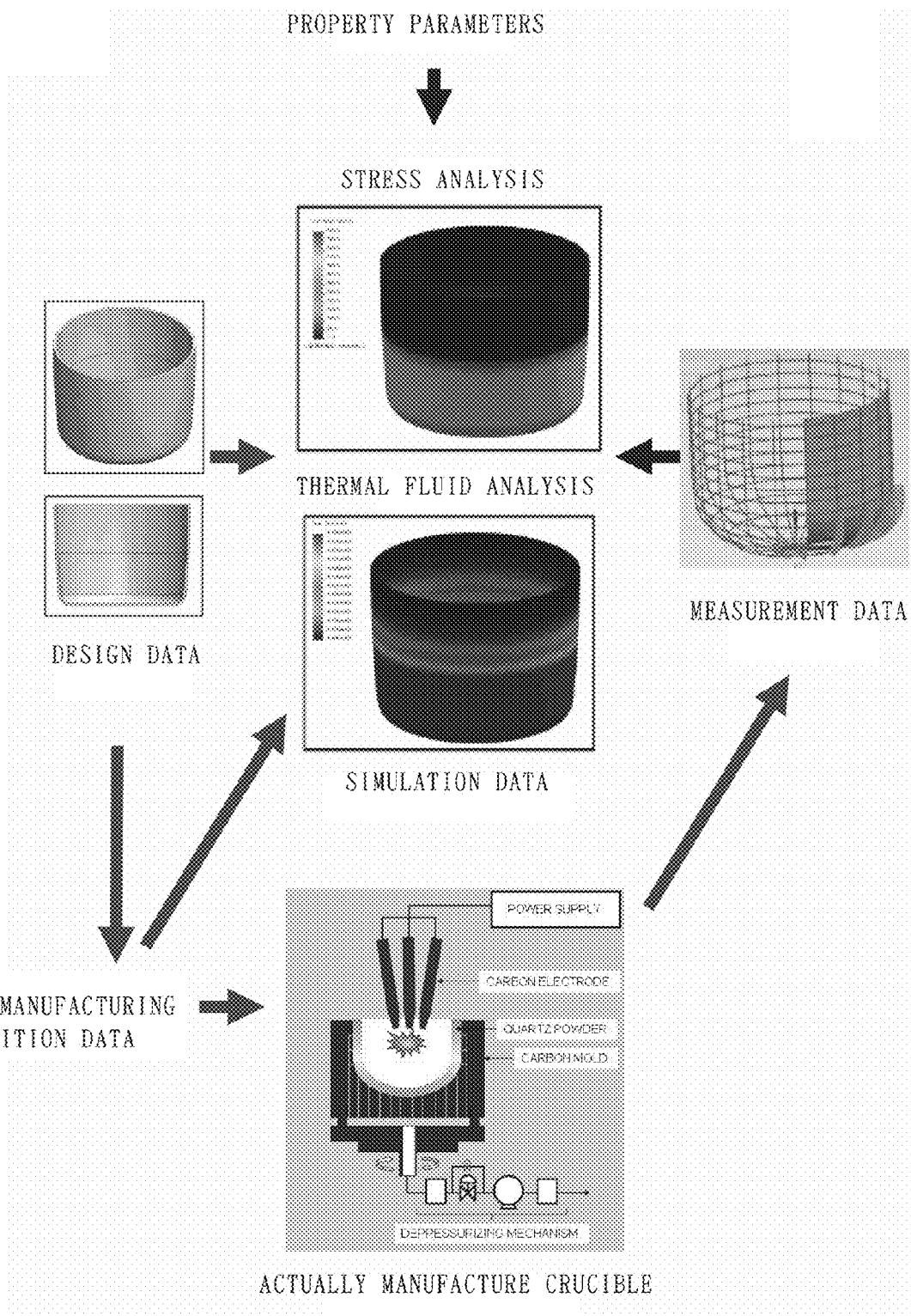

[FIG.2]
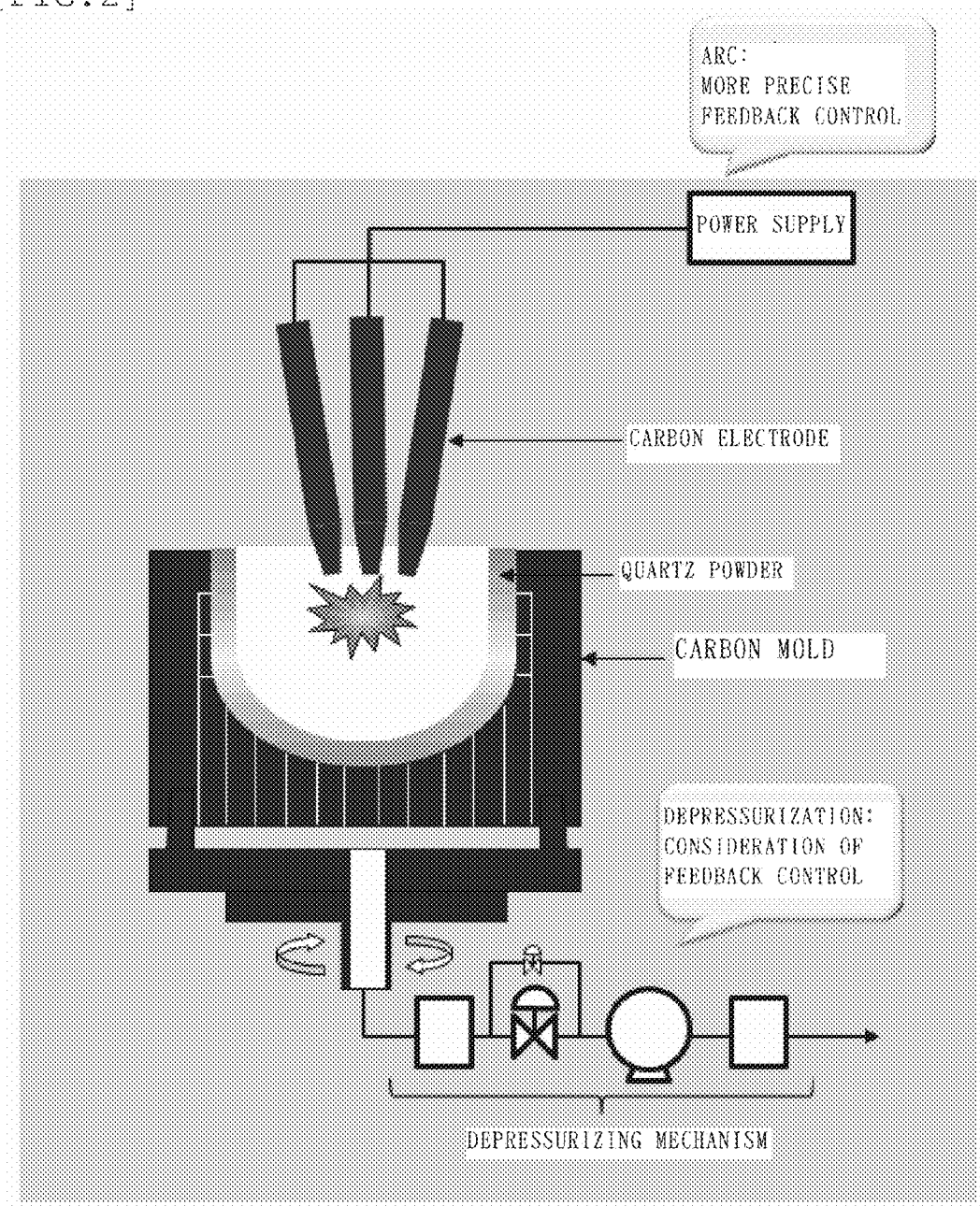

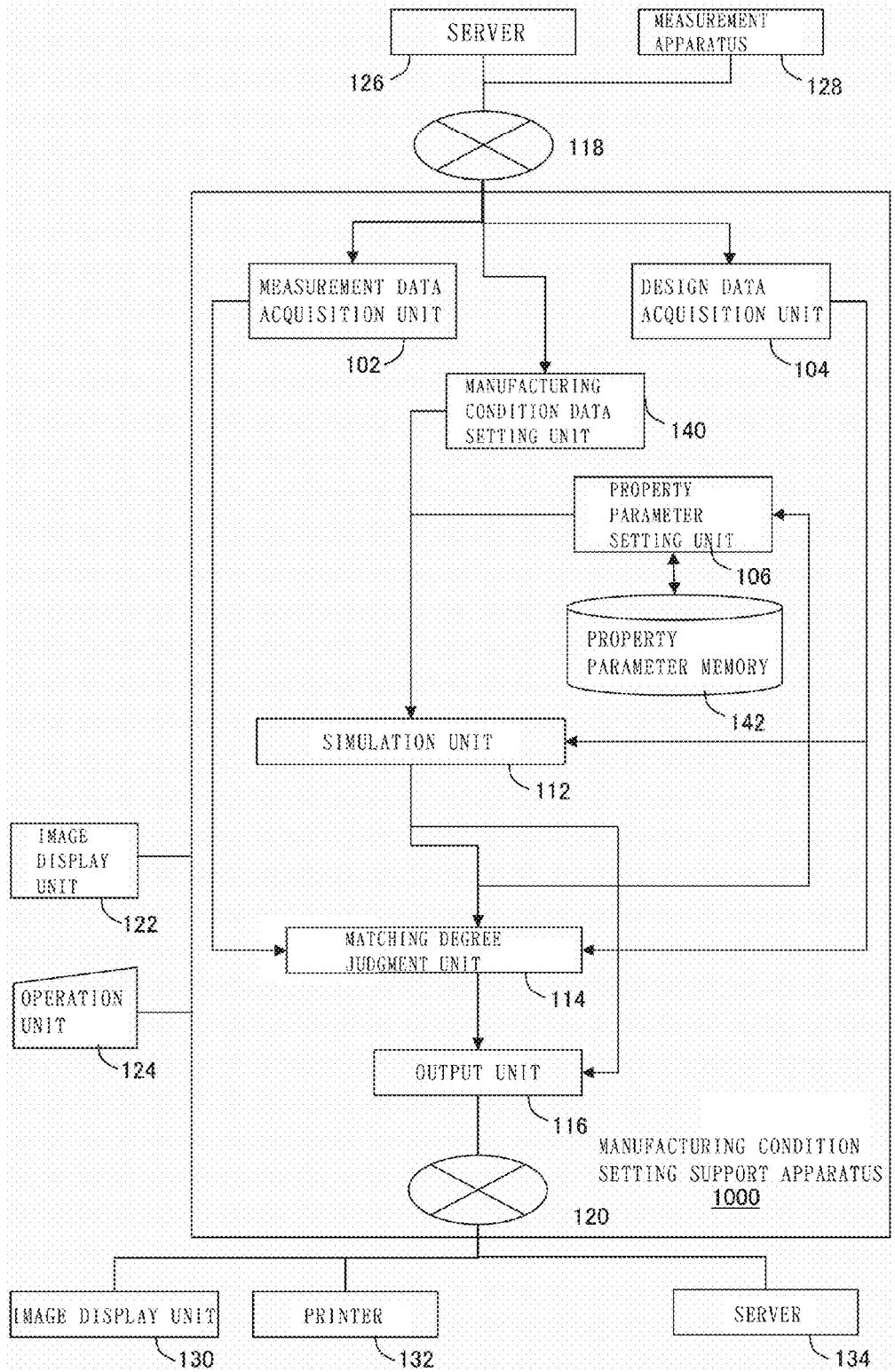
[FIG.3]

[FIG.4]
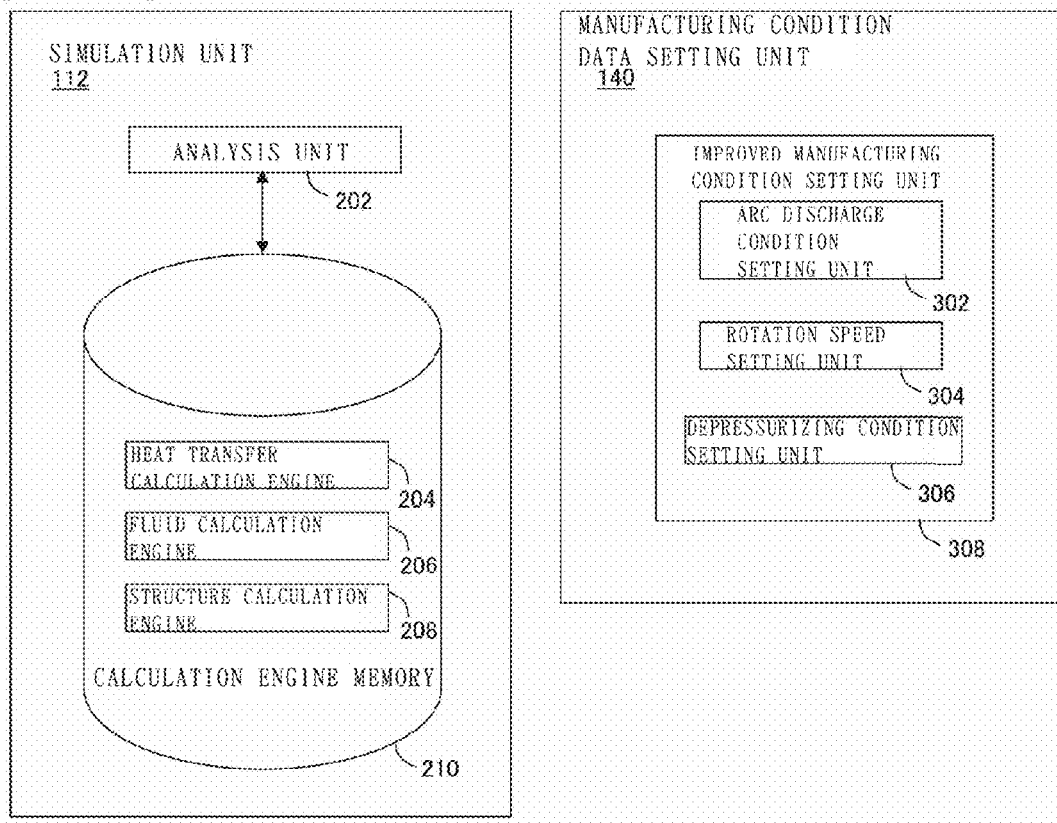
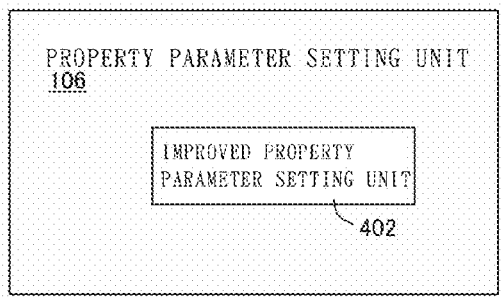

[FIG. 5]

| | INSIDE XYZ COORDINATES | OUTSIDE XYZ COORDINATES | BUBBLE CONTENT | FT-IR SPECTRUM | RAMAN | SURFACE ROUGHNESS |
|---|---|---|---|---|---|---|
| POSITION A | | | | | | |
| POSITION B | | | | | | |
| POSITION C | | | | | | |
| POSITION D | | | | | | |
| POSITION E | | | | | | |

[FIG. 6]
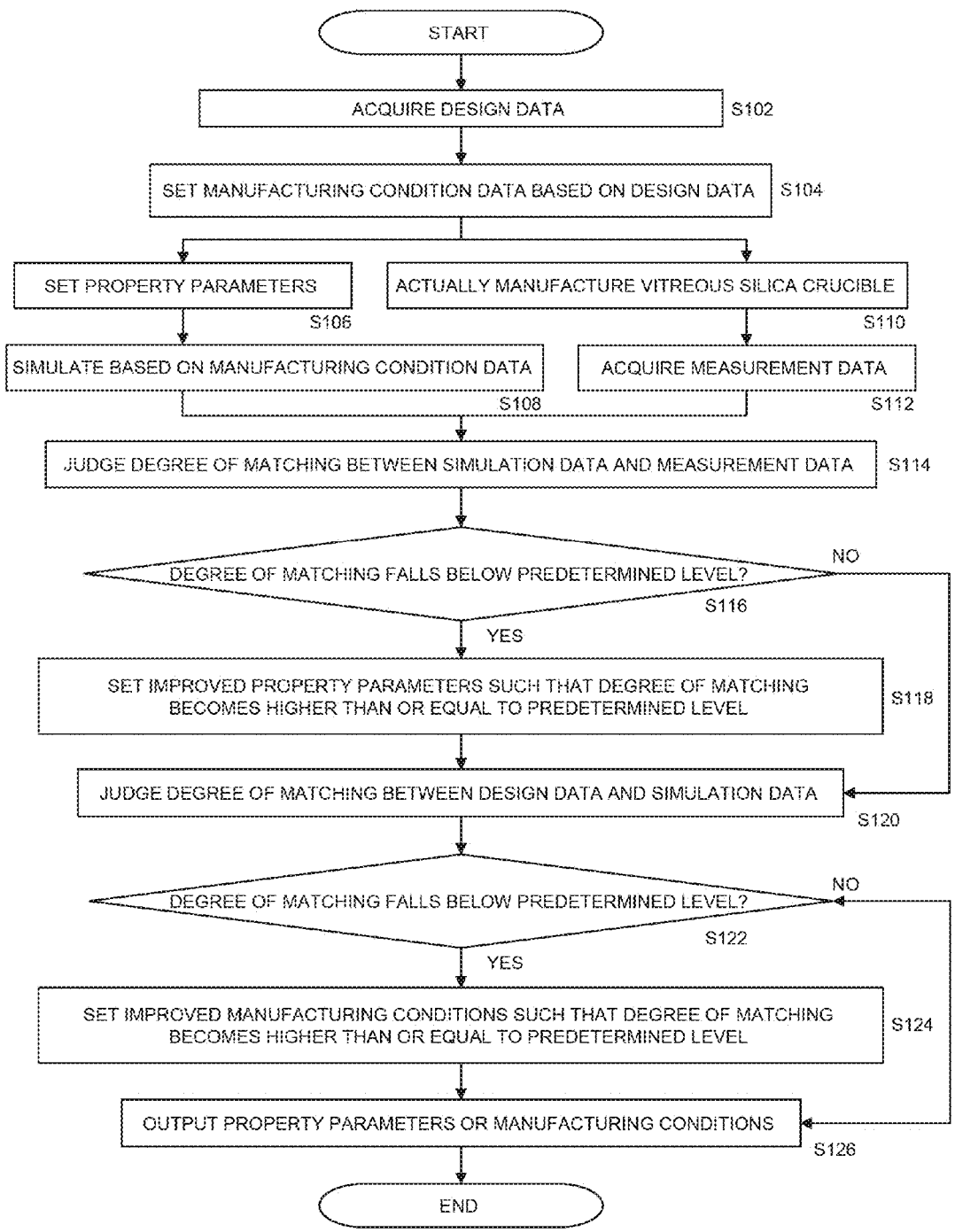

[FIG. 7]
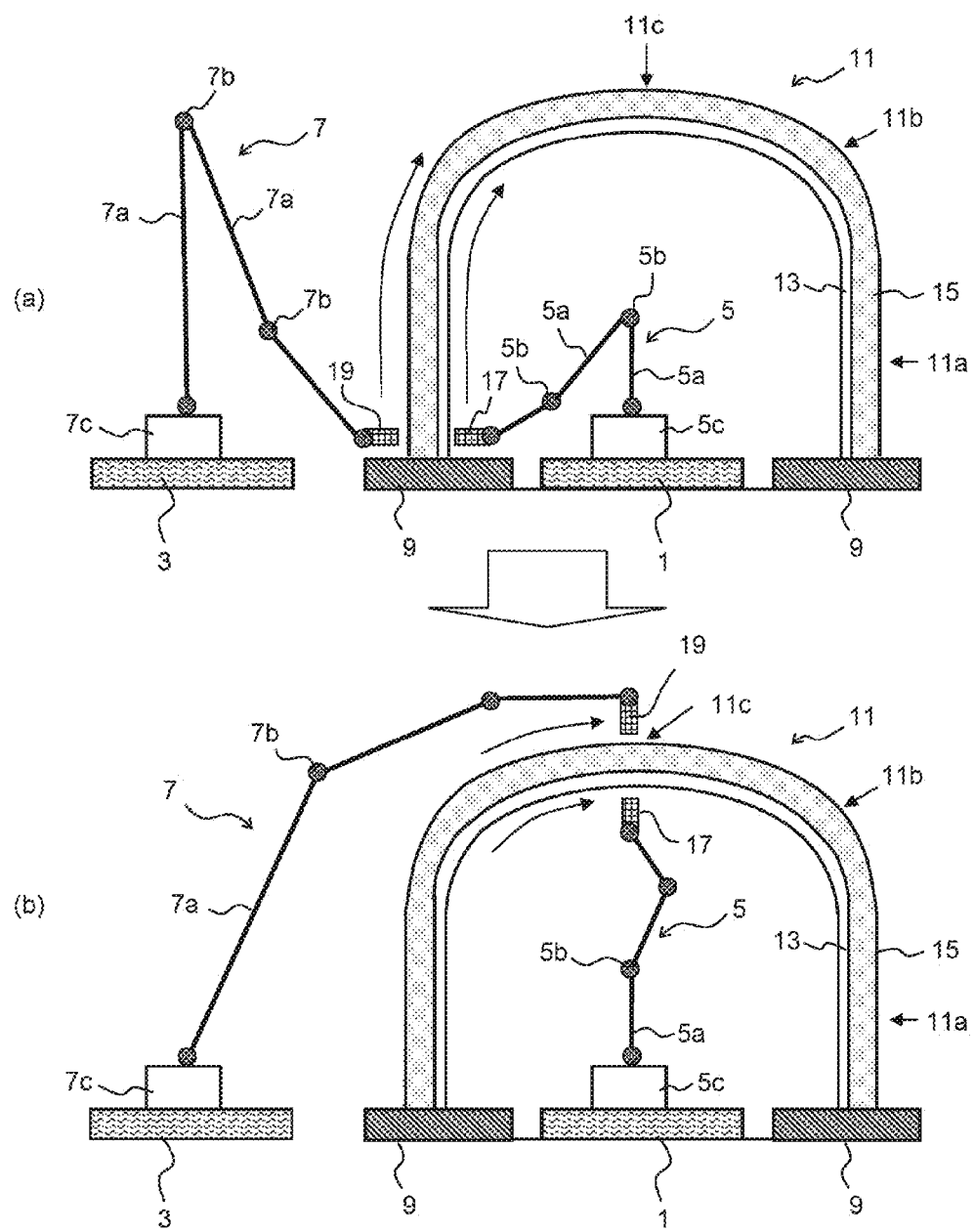

[FIG. 8]
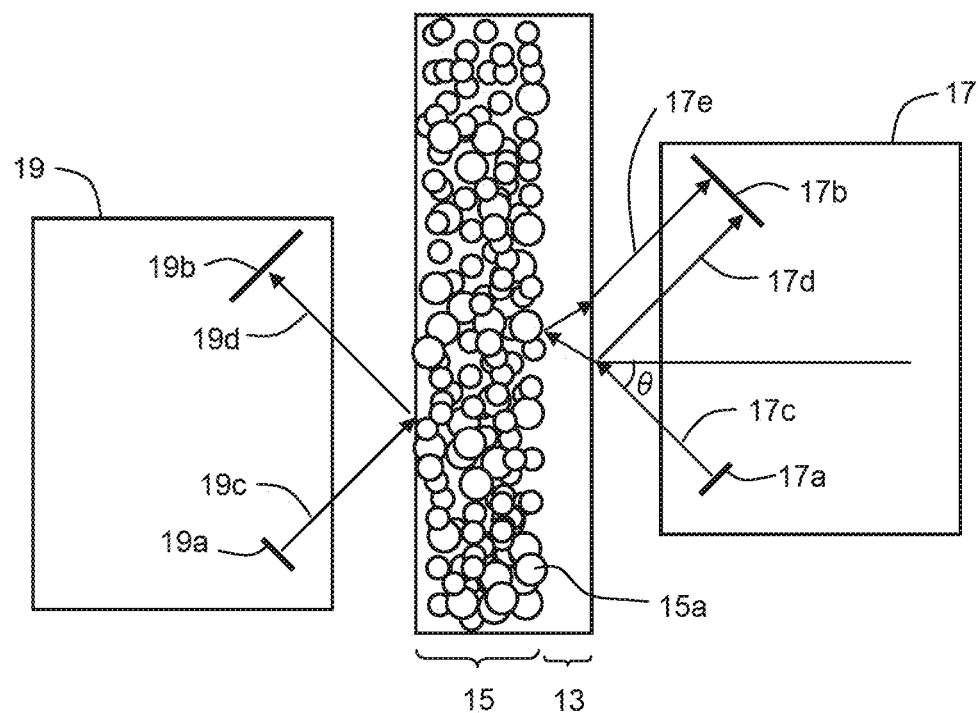

[FIG. 9]
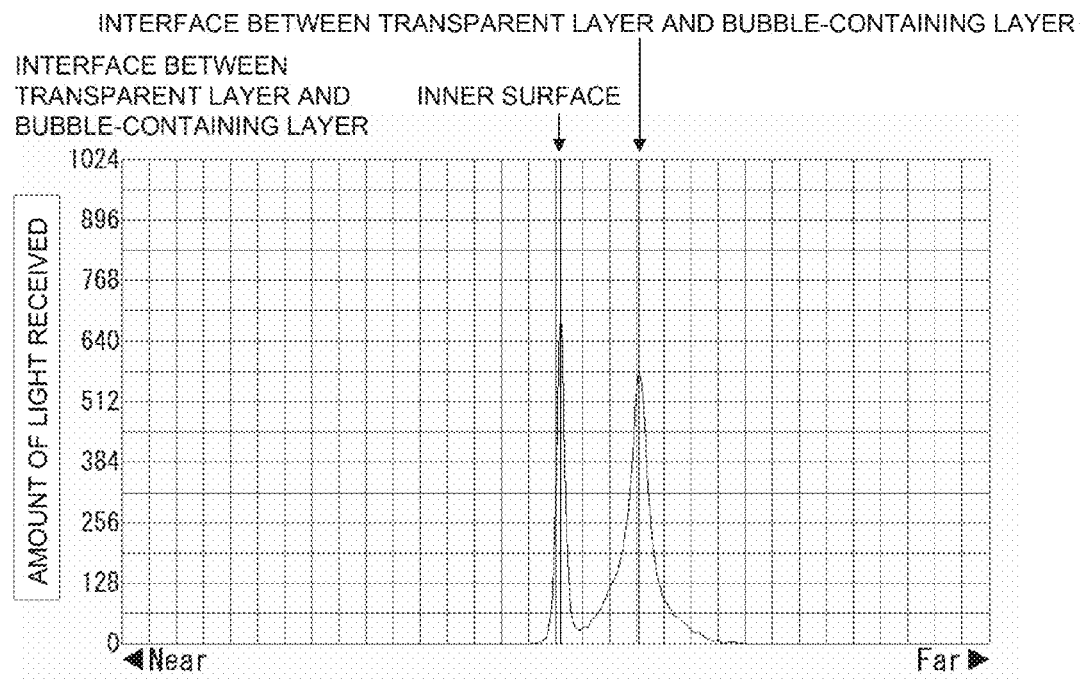
[FIG. 10]
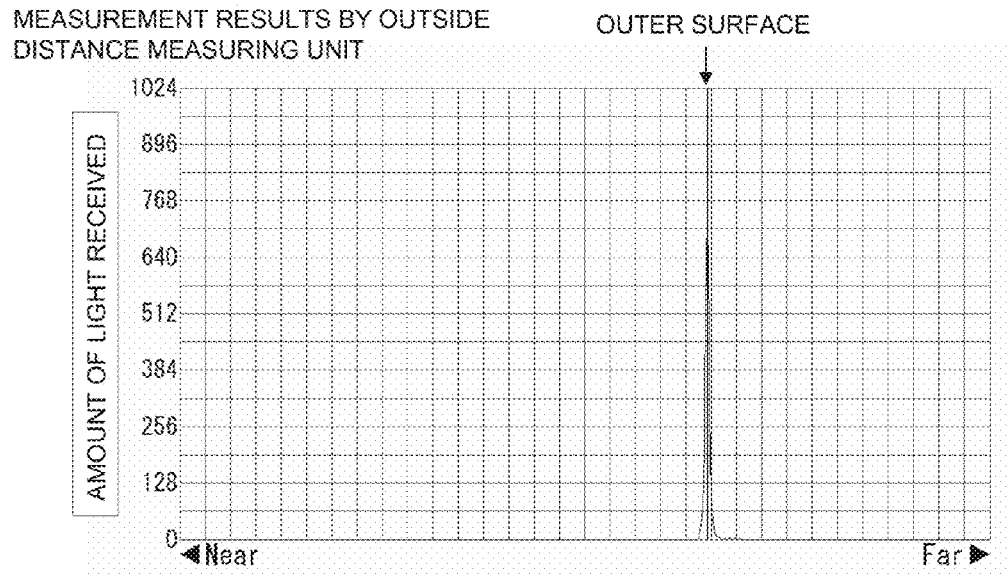

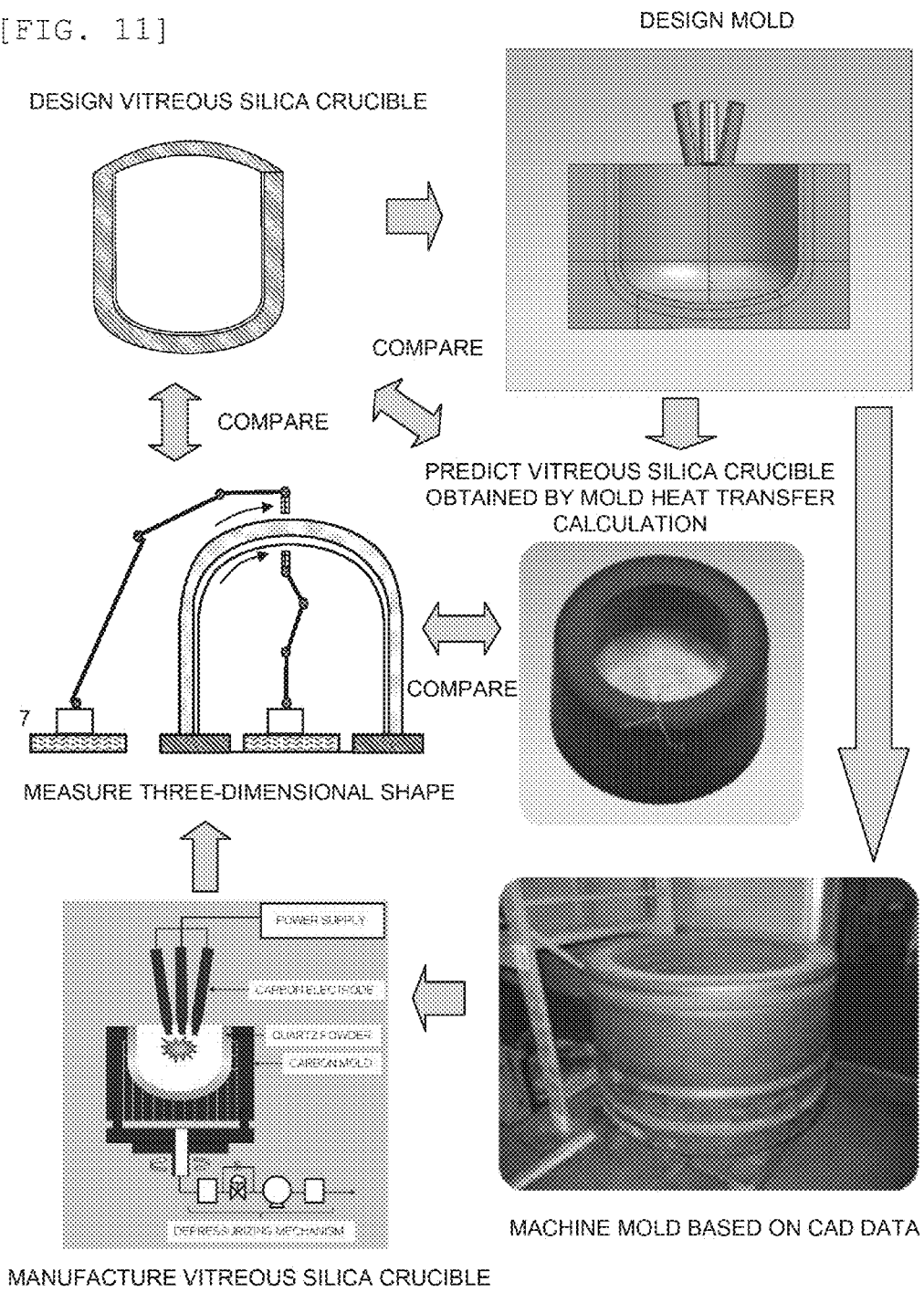
[FIG. 11]

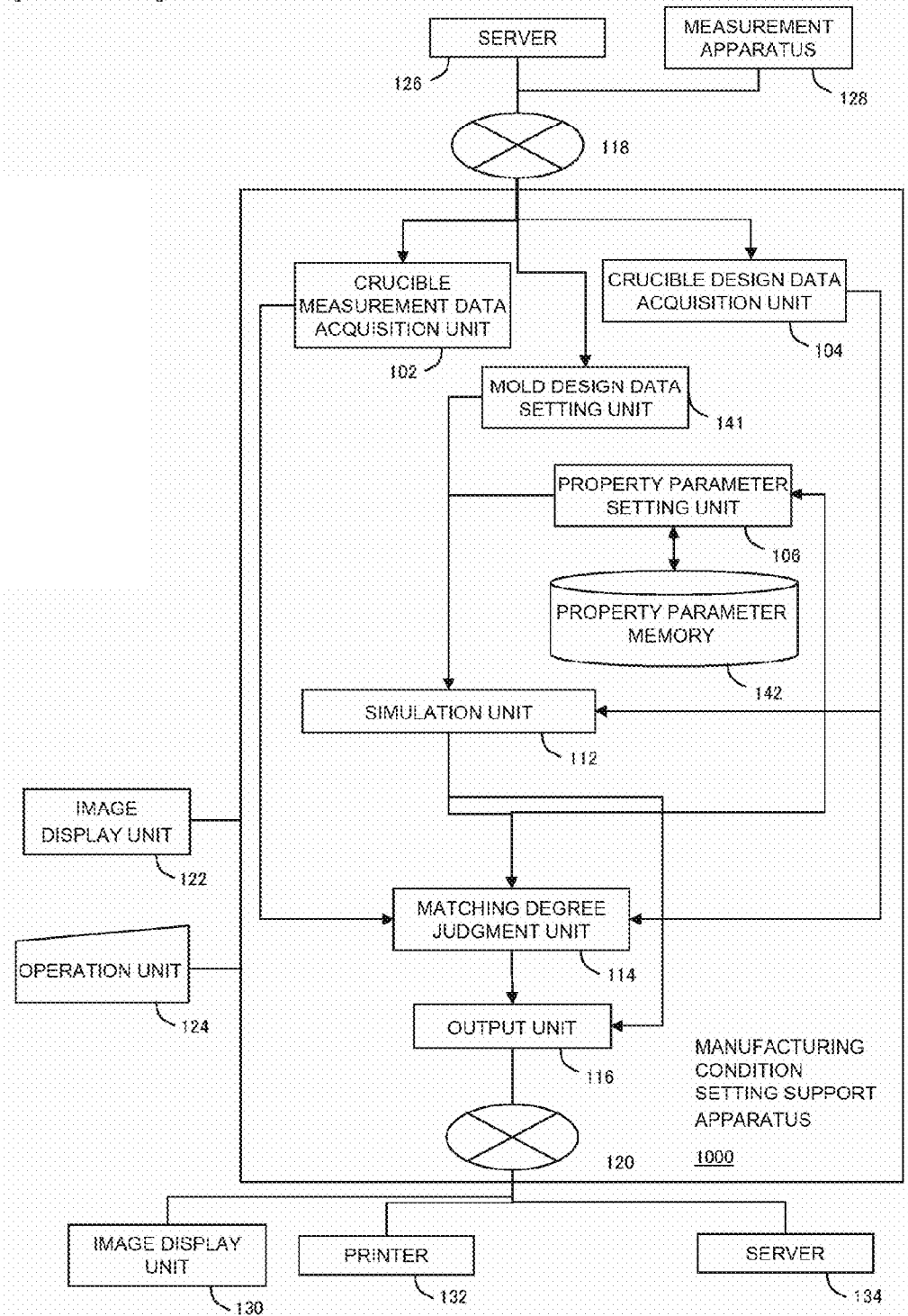

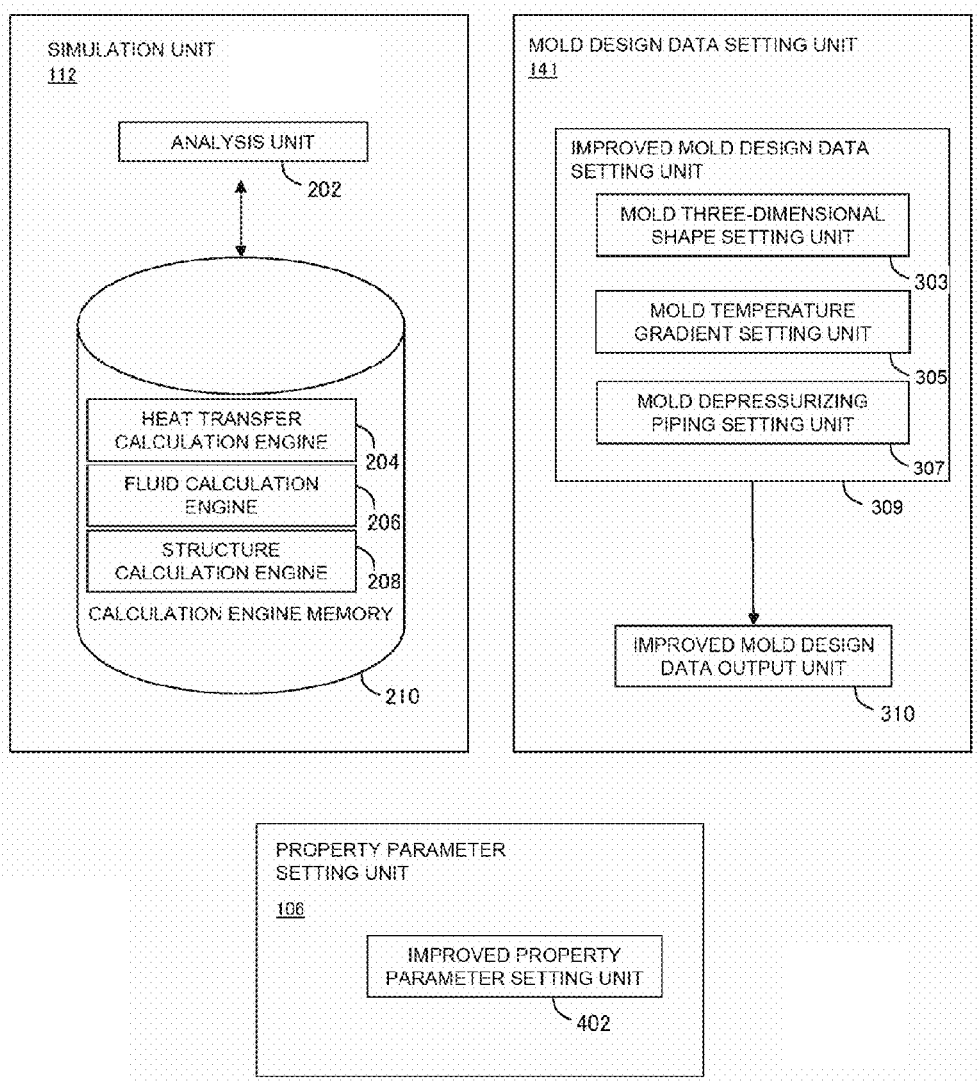

[FIG. 14]
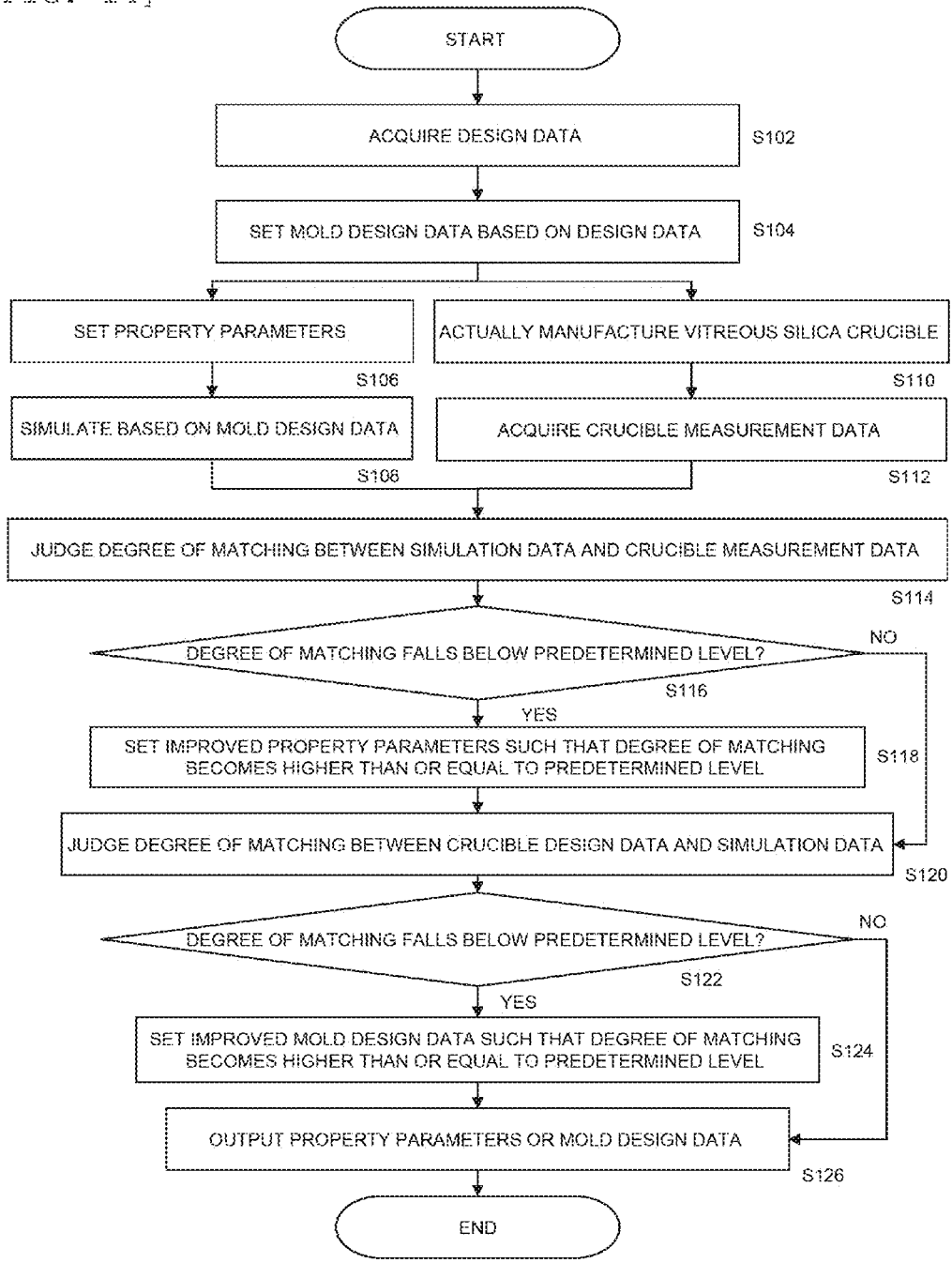

[FIG. 15]
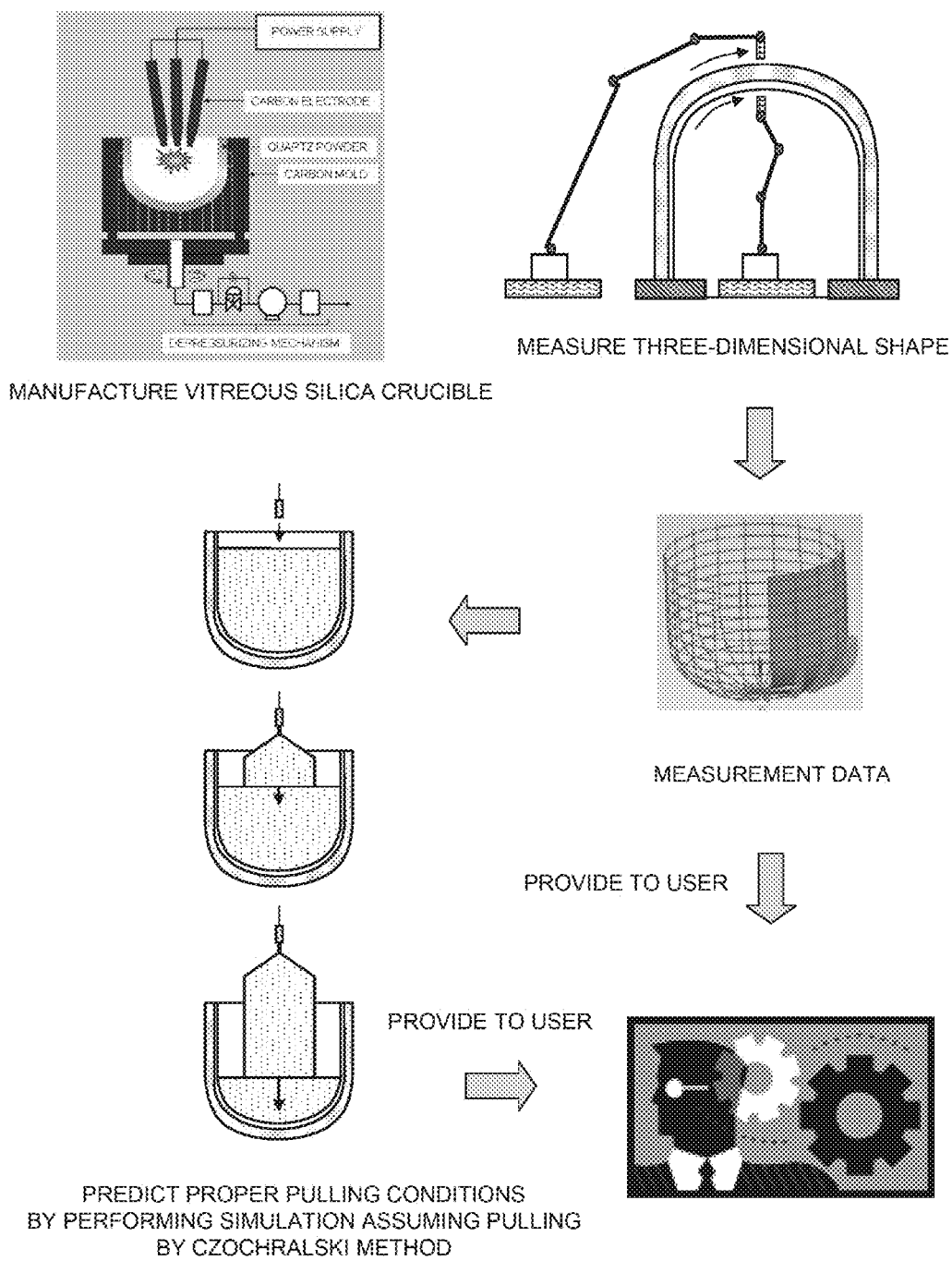

[FIG. 16]
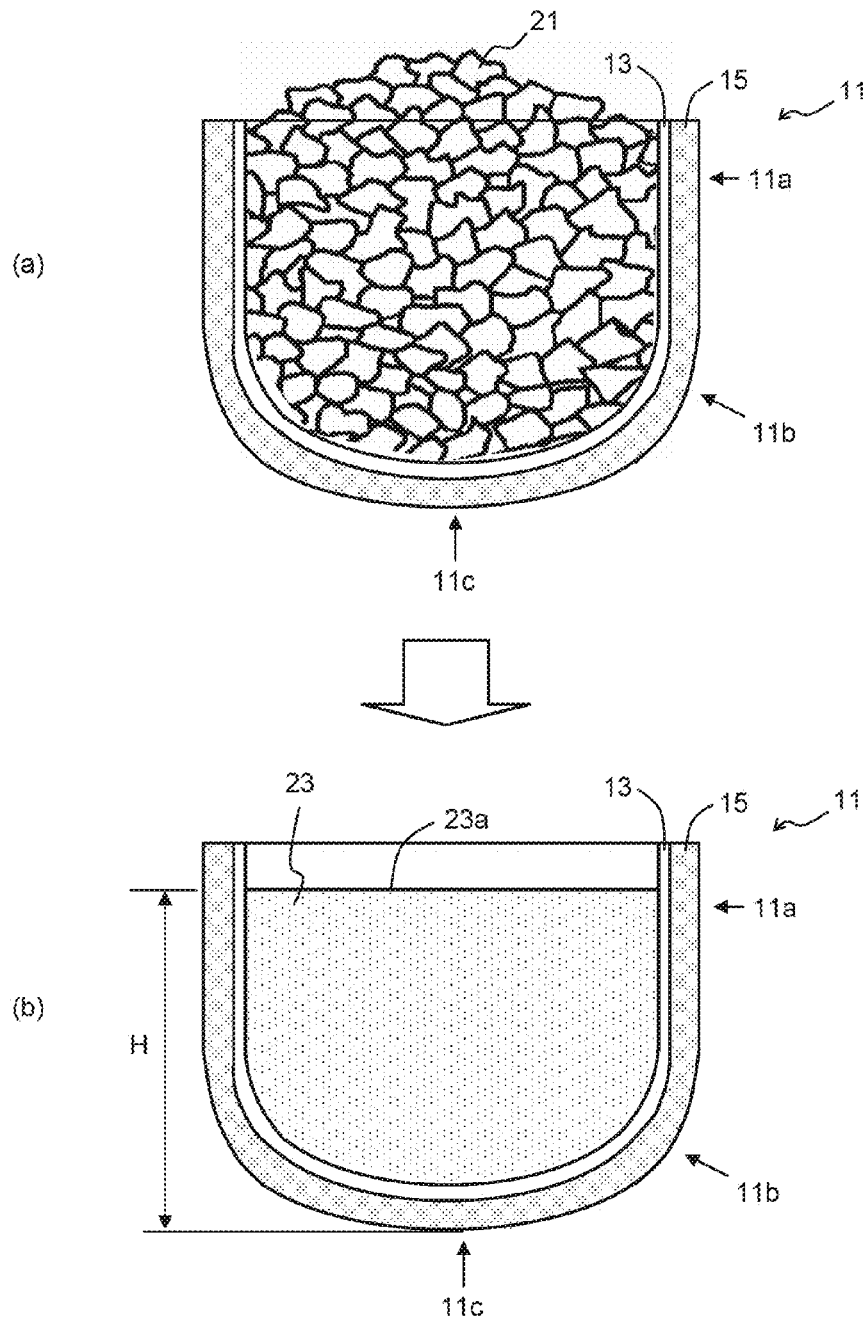

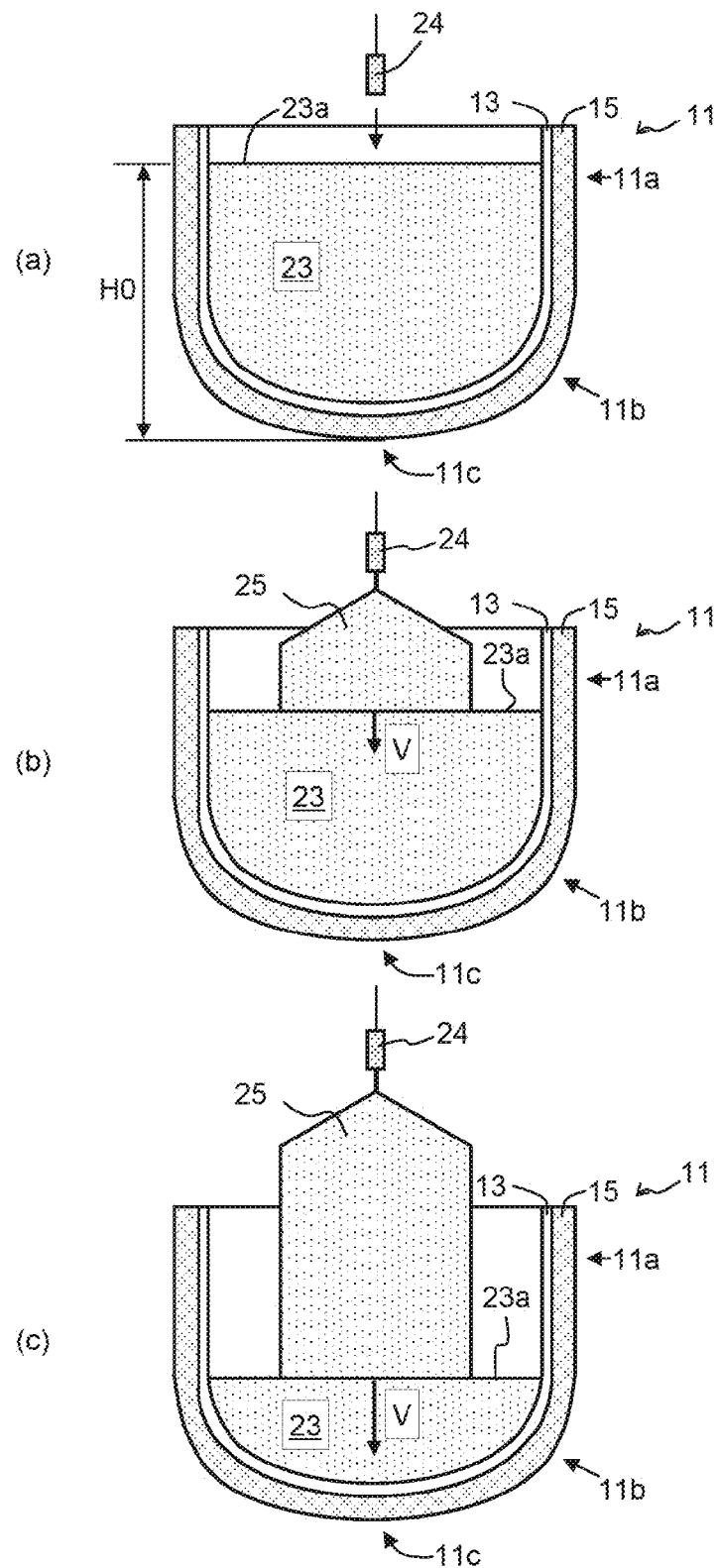
[FIG. 17]

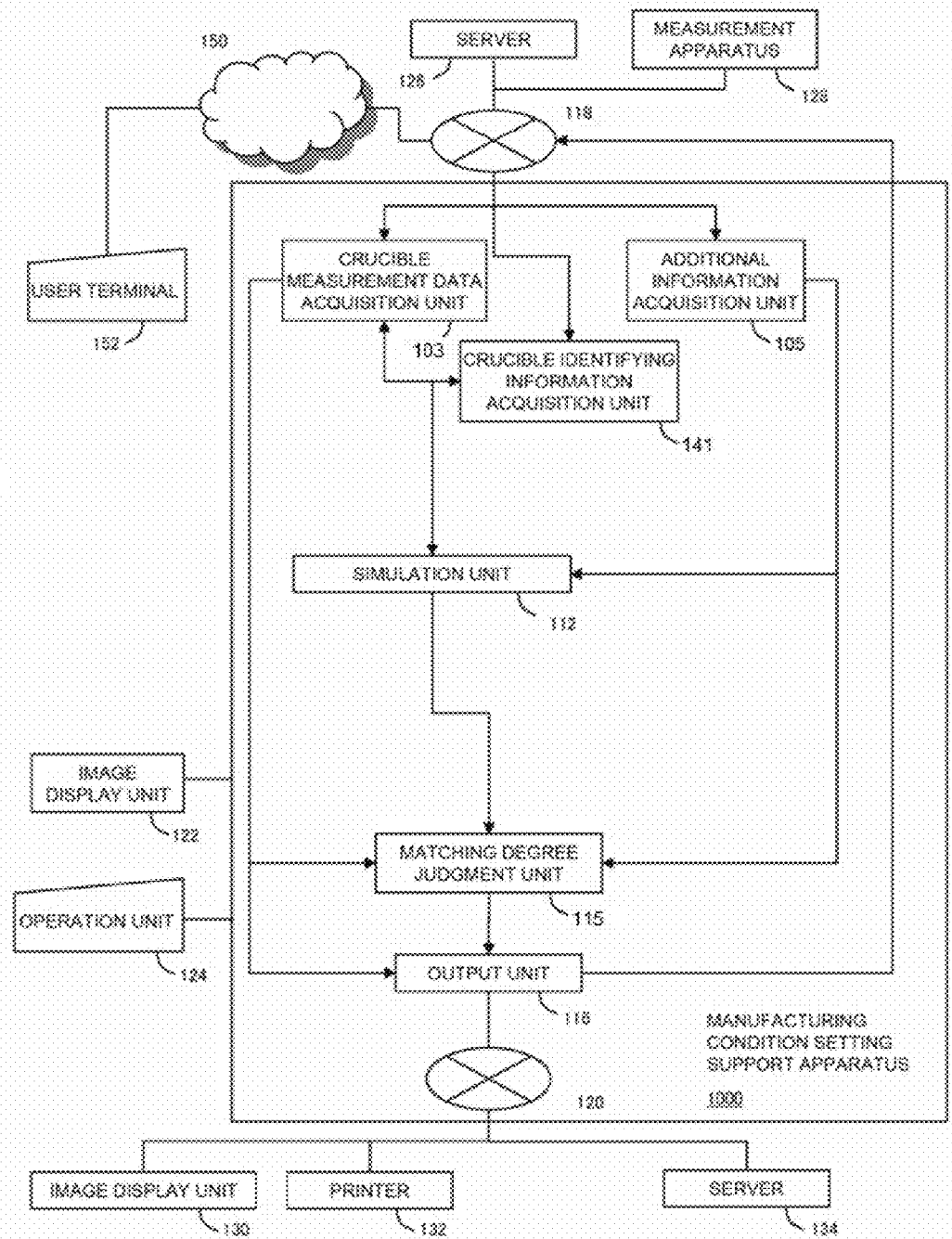

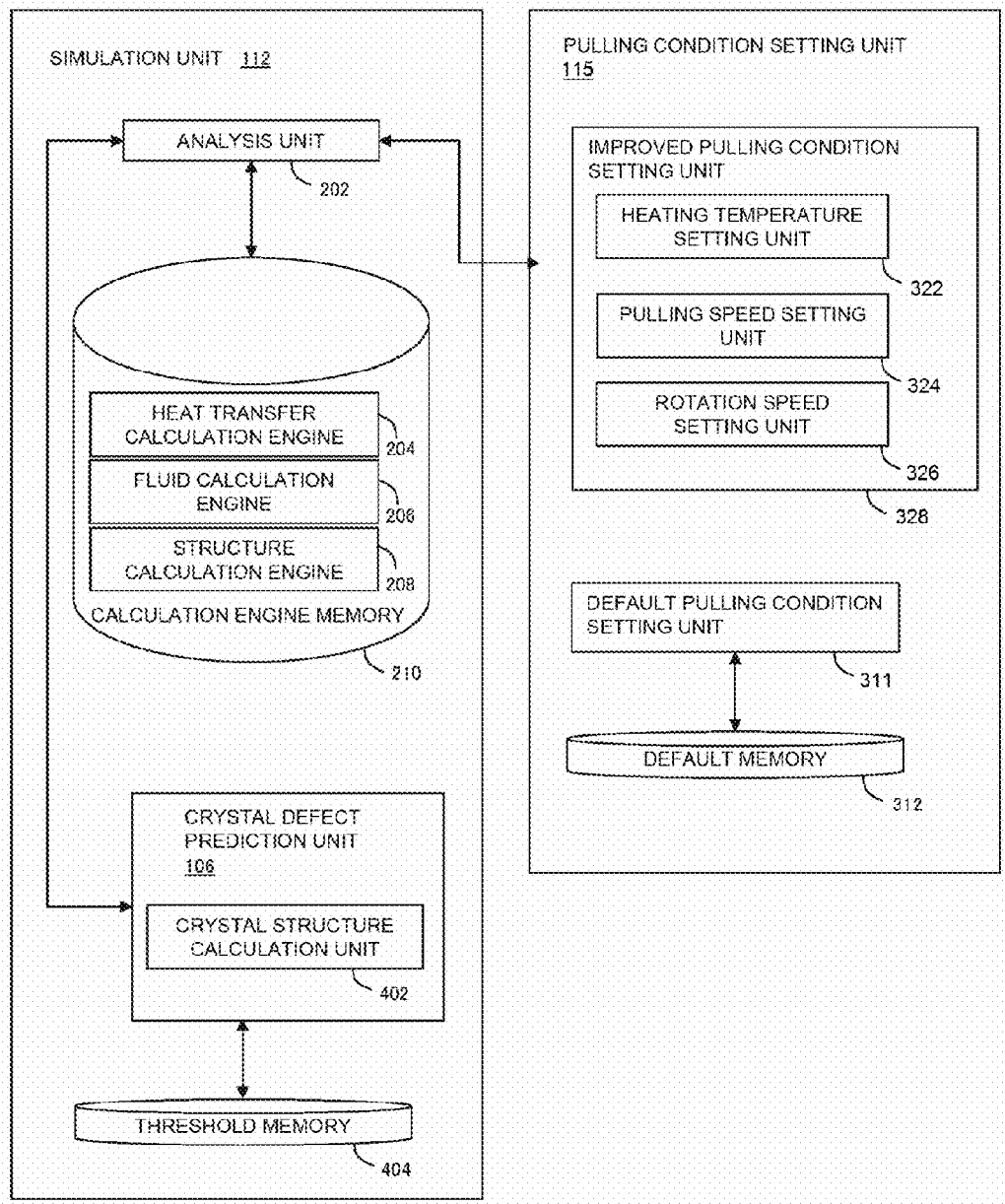
[FIG. 19]

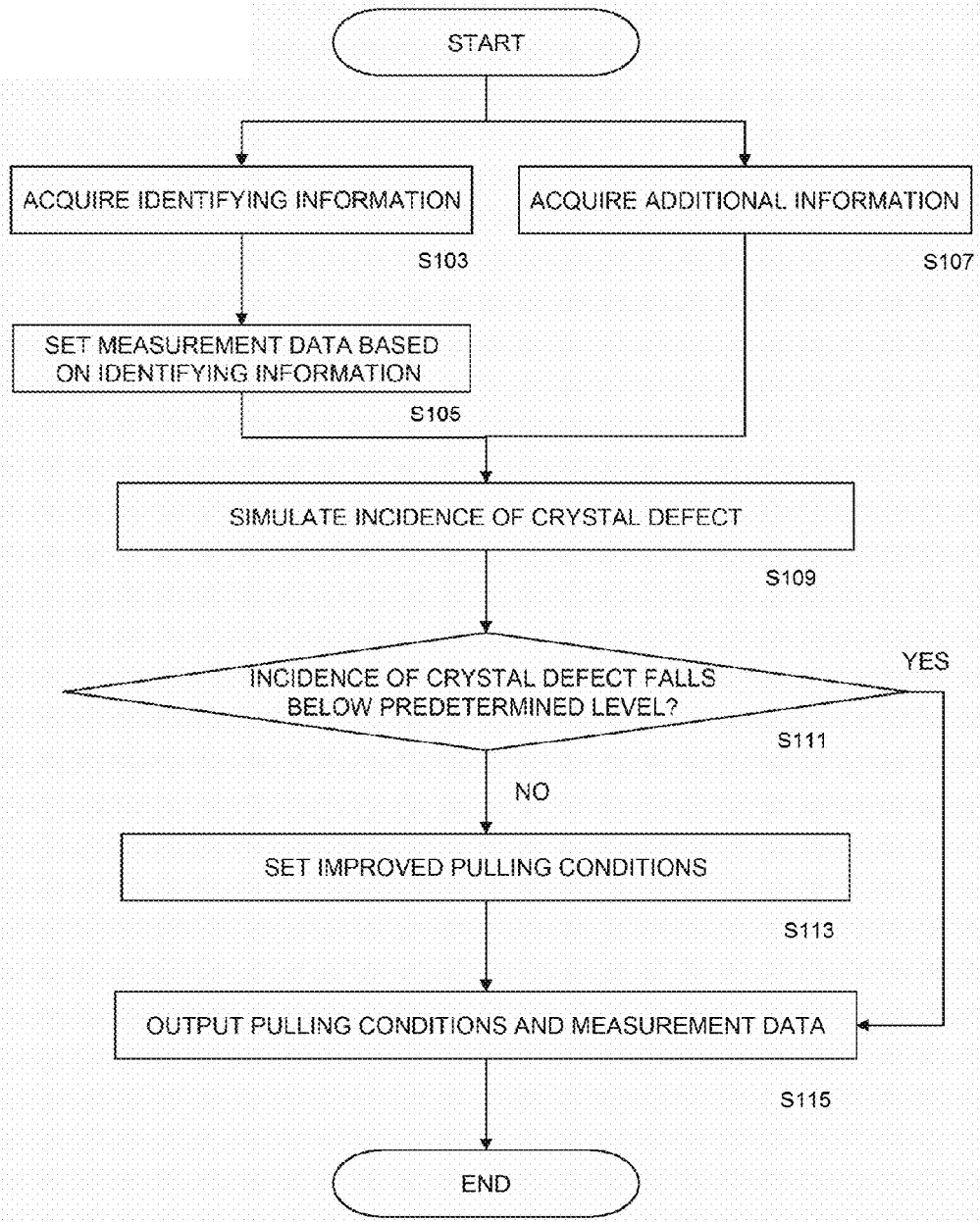

DEVICE FOR ASSISTING WITH SETTING OF MANUFACTURING CONDITIONS FOR SILICA GLASS CRUCIBLE, DEVICE FOR ASSISTING WITH SETTING OF MANUFACTURING CONDITIONS FOR MOLD FOR MANUFACTURING SILICA GLASS CRUCIBLE, DEVICE FOR ASSISTING WITH CONDITION SETTING FOR PULLING UP MONOCRYSTALLINE SILICON USING SILICA GLASS CRUCIBLE

TECHNICAL FIELD

The present invention relates to an apparatus for supporting setting of a manufacturing condition of a vitreous silica crucible, and data obtained by the apparatus; an apparatus for supporting setting of a manufacturing condition of a mold for manufacturing a vitreous silica crucible, and data obtained by the apparatus; and an apparatus for supporting setting of a condition under which a silicon single crystal is pulled by use of a vitreous silica crucible, and data obtained by the apparatus.

BACKGROUND ART

A method for manufacturing a vitreous silica crucible includes, for example, a silica powder layer forming process of forming a silica powder layer by depositing silica powder having an average particle diameter of approx. 300 um on the inner surface of a rotating mold and an arc-fusing process of forming a vitreous silica layer by arc-fusing the silica powder layer while depressurizing the silica powder layer from the mold side (this method is called rotational molding).

In this arc-fusing process, initially, a transparent vitreous silica layer (hereafter referred to as a "transparent layer") is formed by strongly depressurizing the silica powder layer to remove bubbles; and thereafter, a bubble-containing vitreous silica layer where bubbles remain (hereafter referred to as a "bubble-containing layer") is formed by weakly depressurizing the silica powder layer. Thus, a two-layer vitreous silica crucible including the inner transparent layer and the outer bubble-containing layer is formed.

On the other hand, in order to manufacture a silicon single crystal by pulling it by use of a vitreous silica crucible by the Czochralski method, there have been actively developed methods for performing numerical analysis on the shape of the solid-liquid interface between a silicon single crystal, which is a solid, and a silicon melt, which is a liquid, or the temperature distribution around the solid-liquid interface through a computer simulation.

For example, Patent Document 1 discloses that property values of members in a hot zone modeled using a mesh structure are inputted to a computer and then the surface temperature distribution of each member is obtained based on the amount of heat generated by a heater and the emissivity of each member.

PRIOR ART REFERENCE

Patent Document

[Patent Document 1] Japanese Unexamined Patent Application Publication No. 2009-190926

SUMMARY OF THE INVENTION

Problems to be Solved by the Inventions

However, the traditional technology disclosed in Patent Document 1 is difficult to use in a simulation which is performed in manufacturing a vitreous silica crucible by rotational molding. Furthermore, when a vitreous silica crucible is manufactured by rotational molding, the vitreous silica crucible often has a different three-dimensional shape from the design data due to various factors. That is, it has been difficult to actually manufacture a vitreous silica crucible by rotational molding in such a manner that the three-dimensional shape thereof is the same as the design data. It has been also difficult to obtain a mold which can manufacture a vitreous silica crucible in such a manner that the three-dimensional shape of the vitreous silica crucible is the same as the design data. It has been also difficult to use Patent Document 1 in order to set single-crystal silicon pulling conditions which are suitable for properties of individual vitreous silica crucibles.

Semiconductor chip manufacturing processes where 300 mm-diameter wafers are used have gone mainstream in recent years. Processes where 450 mm-diameter wafers are used are also being developed. To manufacture such wafers, a crucible used in the CZ method, which is used to manufacture a single-crystal silicon ingot, has of course been required to have a large opening diameter of 28 inches (71 cm), 32 inches (81 cm), 36 inches (about 91 cm), or 40 inches (102 cm). The weight of a 102 cm-diameter crucible is as heavy as about 120 kg, and the mass of a silicon melt contained therein is 900 kg or more.

A silicon single crystal pulled by use of a vitreous silica crucible is required to have a purity of 99.999999999% or more. Therefore, the inner surface of the vitreous silica crucible is required to be as smooth as that of the three-dimensional shape of the design data. If the inner surface of the vitreous silica crucible is not as smooth as that of the three-dimensional shape of the design data and has a crack or the like, a silica fragment or the like may be peeled from the crack and mixed into the silicon melt, resulting in a significant problem.

It has not been difficult to manufacture a vitreous silica crucible with a small opening diameter in such a manner that the three-dimensional shape thereof is the same as that of the design data. However, as the opening diameter of a vitreous silica crucible is increased, it has been difficult to actually manufacture a vitreous silica crucible by rotational molding in such a manner to have the same three-dimensional shape as that of the design data. Furthermore, as the opening diameter of a vitreous silica crucible is increased, it has been also difficult to obtain a mold which can manufacture a vitreous silica crucible in such a manner that the three-dimensional shape thereof is the same as that of the design data.

The softening point of vitreous silica is about 1200 to 1300° C. In the CZ method, on the other hand, a silicon single crystal is pulled with a silicon melt maintained at a high temperature of 1450 to 1500° C. over as long as two or more weeks. That is, while the silicon single crystal is pulled, the crucible contains 900 kg or more of the silicon melt having a temperature of about 1500° C. Furthermore, a vitreous silica crucible is a disposable product which is disposed of once pull-up of a single-crystal silicon ingot is complete. A vitreous silica crucible is also an expensive product which may cost several tens of thousand dollars per unit, although it is disposable. For these reasons, the user must set information, such as the amount of polycrystalline silicon to be charged or pulling conditions, for each vitreous silica crucible prior to pulling a single-crystal silicon ingot. However, as the opening diameter of a vitreous silica crucible is increased, it has been difficult to set single-crystal silicon pulling conditions which are suitable for properties of individual vitreous silica crucibles.

The present invention has been made in view of the foregoing, and an object thereof is to manufacture a vitreous silica crucible by rotational molding in such a manner that the three-dimensional shape thereof matches that of the design data to a high degree. Another object of the present invention is to obtain a mold which can manufacture a vitreous silica crucible in such a manner that the three-dimensional shape of the vitreous silica crucible matches that of the design data to a high degree. Yet another object of the present invention is to easily set single-crystal silicon pulling conditions which are suitable for properties of individual vitreous silica crucibles.

Means for Solving the Problems

The present invention provides an apparatus for supporting setting of a manufacturing condition of a vitreous silica crucible. This apparatus includes a design data acquisition unit configured to acquire design data of a three-dimensional shape of a vitreous silica crucible of any model, production lot, or serial number; a manufacturing condition data setting unit configured to set manufacturing condition data of a vitreous silica crucible on the basis of the design data; a simulation unit configured to obtain simulation data of a three-dimensional shape of a vitreous silica crucible obtained under the manufacturing condition data, by use of a calculation engine capable of performing one or more kinds of calculation selected from the group consisting of heat transfer calculation, fluid calculation, and structure calculation; a property parameter setting unit configured to set a property parameter used by the calculation engine; a measurement data acquisition unit configured to acquire measurement data of a three-dimensional shape of a vitreous silica crucible manufactured under the manufacturing condition data; a matching degree judgment unit to make a comparison between two kinds of data of the design data, the simulation data, and the measurement data and to judge the degree of matching between the three-dimensional shapes of the two kinds of data; and an output unit configured to output the simulation data or the manufacturing condition data.

The property parameter setting unit includes an improved property parameter setting unit configured to, if the degree of matching between three-dimensional shapes of the simulation data obtained based on an initial property parameter and the measurement data falls below a predetermined level, set an improved property parameter such that the degree of matching becomes higher than or equal to the predetermined level. The manufacturing condition data setting unit includes an improved manufacturing condition data setting unit configured to set a manufacturing condition such that simulation data matching the design data to a degree higher than or equal to a predetermined level is obtained.

According to this configuration, if the degree of matching between the three-dimensional shapes of the simulation data obtained based on the initial property parameter and the measurement data falls below the predetermined level, an improved property parameter is set such that the degree of matching becomes higher than or equal to the predetermined level. Thus, the degree of matching between the three-dimensional shapes of the simulation data and the measurement data can be enhanced to the predetermined level or higher. Furthermore, a manufacturing condition is set such that simulation data matching the design data to a degree higher than or equal to the predetermined degree is obtained. Thus, the degree of matching between the three-dimensional shapes of the design data and the simulation data can be enhanced to the predetermined level or higher. As a result, the degree of matching between the three-dimensional shapes of the design data and measurement data of the vitreous silica crucible can be enhanced to the predetermined level or higher. That is, it is possible to manufacture a vitreous silica crucible by rotational molding in such a manner that the three-dimensional shape thereof matches the design data to a high degree.

Furthermore, according to the present invention, simulation data obtained by the above apparatus is provided.

As described above, the degree of matching between the three-dimensional shapes of the simulation data and the measurement data is higher than or equal to the predetermined level. Therefore, use of this simulation data allows accurate prediction of the three-dimensional shape of a vitreous silica crucible which will be actually manufactured by rotational molding.

Furthermore, according to the present invention, improved manufacturing condition data obtained by the above apparatus is provided.

As described above, use of this improved manufacturing condition data allows acquisition of simulation data matching the design data to a degree higher than or equal to the predetermined level. Furthermore, if the degree of matching between the three-dimensional shapes of the simulation data obtained based on the initial property parameter and the measurement data falls below the predetermined level, an improved property parameter is set such that the degree of matching becomes higher than or equal to the predetermined level. Thus, the degree of matching between the three-dimensional shapes of the simulation data and the measurement data can be enhanced to the predetermined level or higher. As a result, it is possible to manufacture a vitreous silica crucible by rotational molding in such a manner that the three-dimensional shape thereof matches the design data to a high degree.

The present invention also provides an apparatus for supporting setting of a manufacturing condition of a mold for manufacturing a vitreous silica crucible. The apparatus includes a crucible design data acquisition unit configured to acquire design data of a three-dimensional shape of a vitreous silica crucible of any model, production lot, or serial number; a mold design data setting unit configured to set design data of a three-dimensional shape of a mold on the basis of the crucible design data; a simulation unit configured to obtain simulation data of a three-dimensional shape of a vitreous silica crucible by use of a calculation engine capable of performing one or more kinds of calculation selected from heat transfer calculation, fluid calculation, and structure calculation, the vitreous silica crucible being obtained by arc-fusing silica powder on a mold having a three-dimensional shape according to the mold design data; a property parameter setting unit configured to set a property parameter used by the calculation engine; a crucible measurement data acquisition unit configured to acquire crucible measurement data of a three-dimensional shape of a vitreous silica crucible obtained by arc-fusing silica powder on a mold manufactured based on the mold design data; a matching degree judgment unit to make a comparison between two kinds of data of the crucible design data, the simulation data, and the crucible measurement data and to judge the degree of matching between the three-dimensional shapes of the two kinds of data; and an output unit configured to output the simulation data or the mold design data.

The property parameter setting unit includes an improved property parameter setting unit configured to, if the degree of matching between three-dimensional shapes of the simulation data obtained based on an initial property parameter and the crucible measurement data falls below a predetermined level, set an improved property parameter such that the degree of matching becomes higher than or equal to the predetermined level. The mold design data setting unit includes an improved mold design data setting unit configured to set improved mold design data such that simulation data matching the crucible design data to a degree higher than or equal to a predetermined level is obtained.

According to this configuration, if the degree of matching between the three-dimensional shapes of the simulation data obtained based on the initial property parameter and the measurement data falls below the predetermined level, an improved property parameter is set such that the degree of matching becomes higher than or equal to the predetermined level. Thus, the degree of matching between the three-dimensional shapes of the simulation data and the measurement data can be enhanced to the predetermined level or higher. Furthermore, mold design data is set such that simulation data matching the design data to a degree higher than or equal to the predetermined degree is obtained. Thus, the degree of matching between the three-dimensional shapes of the design data and the simulation data can be enhanced to the predetermined level or higher. As a result, the degree of matching between the three-dimensional shapes of the design data and measurement data of the vitreous silica crucible can be enhanced to the predetermined level or higher. That is, it is possible to obtain a mold which can manufacture a vitreous silica crucible in such a manner that the three-dimensional shape thereof matches the design data to a high degree.

Furthermore, according to the present invention, simulation data obtained by the above apparatus is provided.

As described above, the degree of matching between the three-dimensional shapes of the simulation data and the measurement data is higher than or equal to the predetermined level. Therefore, use of this simulation data allows accurate prediction of the three-dimensional shape of a vitreous silica crucible which will be actually manufactured by use of a mold manufactured based on the mold design data.

Furthermore, according to the present invention, improved mold design data obtained by the above apparatus is provided.

As described above, use of this improved mold design data allows acquisition of simulation data matching the design data to a degree higher than or equal to the predetermined level. Furthermore, if the degree of matching between the three-dimensional shapes of the simulation data obtained based on the initial property parameter and the measurement data falls below the predetermined level, an improved property parameters is set such that the degree of matching is higher than or equal to the predetermined level. Thus, the degree of matching between the three-dimensional shapes of the simulation data and the measurement data can be enhanced to the predetermined level or higher. Therefore, by using a mold manufactured based on this improved mold design data, it is possible to manufacture a vitreous silica crucible by rotational molding in such a manner that the three-dimensional shape thereof matches the design data to a higher degree.

The present invention also provides an apparatus for supporting setting of a condition under which a silicon single crystal is pulled using a vitreous silica crucible. The apparatus includes a crucible identifying information acquisition unit configured to acquire crucible identifying information by which a vitreous silica crucible can be identified, the crucible identifying information being inputted by a user; a measurement data acquisition unit configured to acquire measurement data of a three-dimensional shape of a vitreous silica crucible identified by the crucible identifying information; a simulation unit configured to, assuming that a silicon single crystal is pulled by use of a vitreous silica crucible having a three-dimensional shape according to the measurement data, obtain simulation data of the incidence of a crystal defect by use of a calculation engine capable of performing one or more kinds of calculation selected from the group consisting of heat transfer calculation, fluid calculation, and structure calculation; a pulling condition setting unit configured to set pulling conditions used by the simulation unit and comprising heating temperature, pulling speed, and rotation speed and to, if the simulation data of the incidence of a crystal defect obtained based on initial pulling conditions exceeds a predetermined level, set improved pulling conditions such that the incidence of a crystal defect becomes equal to or lower than the predetermined level; and an output unit configured to output the pulling conditions.

According to this configuration, a vitreous silica crucible inputted by the user is identified and then a simulation is performed based on the measurement data of the three-dimensional shape of the vitreous silica crucible. Thus, it is possible to output improved pulling conditions such that the incidence of a crystal defect becomes equal to or lower than the predetermined level. As a result, the user can easily set silicon single crystal pulling conditions which are suitable for properties of individual vitreous silica crucibles.

The present invention also provides another apparatus for supporting setting of a condition under which a silicon single crystal is pulled using a vitreous silica crucible. This apparatus includes a crucible identifying information acquisition unit configured to acquire crucible identifying information by which a vitreous silica crucible can be identified, the crucible identifying information being inputted by a user; a measurement data acquisition unit configured to acquire measurement data of a three-dimensional shape of a vitreous silica crucible identified by the crucible identifying information; and an output unit configured to output the measurement data.

According to this configuration, a vitreous silica crucible inputted by the user is identified and then the measurement data of the three-dimensional shape of the vitreous silica crucible is outputted. Thus, based on the measurement data of the three-dimensional shape of the vitreous silica crucible, the user can easily set silicon single crystal pulling conditions which are suitable for properties of individual vitreous silica crucibles.

Effects of the Invention

According to the present invention, it is possible to manufacture a vitreous silica crucible by rotational molding in such a manner that the three-dimensional shape thereof matches the design data to a high degree. It is also possible to obtain a mold which can manufacture a vitreous silica crucible in such a manner that the three-dimensional shape of the vitreous silica crucible matches the design data to a high degree. It is also possible to easily set single-crystal silicon pulling conditions which are suitable for properties of individual vitreous silica crucibles.

BRIEF DESCRIPTION OF THE DRAWINGS

FIG. 1 is a conceptual diagram showing the operating principles of an apparatus of a first embodiment.

FIG. 2 is a conceptual diagram showing that an arc power supply and a depressurizing mechanism are precisely feedback-controlled in a vitreous silica crucible manufacturing process on the basis of improved manufacturing condition data or improved mold design data obtained by use of the apparatus of the first embodiment or an apparatus of a second embodiment.

FIG. 3 is a function block diagram showing the overall configuration of the apparatus of the first embodiment.

FIG. 4 is a function block diagram showing the detailed configurations of a simulation unit, a manufacturing condition data setting unit, and a property parameter setting unit of the apparatus of the first embodiment.

FIG. 5 is a data table showing the configuration of the measurement data of a vitreous silica crucible used by the apparatuses of the first to third embodiments.

FIG. 6 is a flowchart showing the operations of the apparatus of the first embodiment.

FIGS. 7($a$) and 7($b$) are measurement process diagrams showing a method for obtaining the measurement data of a vitreous silica crucible used by the apparatuses of the first to third embodiments, by use of robot arms and distance measuring units.

FIG. 8 is a conceptual diagram showing measurement principles in FIGS. 7($a$) and 7($b$).

FIG. 9 is a graph showing the results of measurements performed by an inside distance measuring unit in FIGS. 7($a$) and 7($b$).

FIG. 10 is a graph showing the results of measurements performed by an outside distance measuring unit in FIGS. 7($a$) and 7($b$).

FIG. 11 is a conceptual diagram showing the operating principles of the apparatus of the second embodiment.

FIG. 12 is a function block diagram showing the overall configuration of the apparatus of the second embodiment.

FIG. 13 is a function block diagram showing the detailed configurations of a simulation unit, a mold design data setting unit, and a property parameter setting unit of the apparatus of the second embodiment.

FIG. 14 is a flowchart showing the operations of the apparatus of the second embodiment.

FIG. 15 is a conceptual diagram showing the operating principles of the apparatus of the third embodiment.

FIGS. 16($a$) and 16($b$) are conceptual diagrams showing that the user properly charges and fuses a monocrystalline silicon raw material in a single-crystal silicon pulling process on the basis of the measurement data of the three-dimensional shape of a vitreous silica crucible obtained by use of the apparatus of the third embodiment.

FIGS. 17($a$) to 17($c$) are conceptual diagrams showing that the user feedback-controls heating temperature, pulling speed, and rotation speed more precisely in a single-crystal silicon pulling process under pulling condition data obtained by the apparatus of the third embodiment.

FIG. 18 is a function block diagram showing the overall configuration of the apparatus of the third embodiment.

FIG. 19 is a function block diagram showing the detailed configurations of a simulation unit and a pulling condition setting unit of the apparatus of the third embodiment.

FIG. 20 is a flowchart showing the operations of the apparatus of the third embodiment.

DESCRIPTION OF THE PREFERRED EMBODIMENTS

Hereafter, embodiments of the present invention will be described with reference to the drawings. Note that different components may be given similar reference signs in first to third embodiments.

First Embodiment

Apparatus for Supporting Setting of Manufacturing Conditions of Vitreous Silica Crucible FIG. 1 is a conceptual diagram showing the operating principles of an apparatus of the present embodiment. To set manufacturing conditions of a vitreous silica crucible by use of the apparatus of the present embodiment, first, design data of a vitreous silica crucible is generated by use of three-dimensional CAD system or the like. This three-dimensional CAD data may be obtained by converting two-dimensional CAD data.

Then, vitreous silica crucible manufacturing condition data (for example, a timetable of arc power, depressurizing conditions, mold rotation speed, and the like) is set based on the design data. For example, manufacturing condition data that a skilled operator or engineer regards as being appropriate based on previously obtained knowledge and experience may be set as initial manufacturing condition data. Alternatively, manufacturing condition data which is included in past vitreous silica crucible manufacturing records and under which a predetermined model of vitreous silica crucible showed a good result in a quality inspection may be used as initial manufacturing condition data as it is.

Then, a vitreous silica crucible is manufactured by depositing silica powder (may also be called quartz powder) on a mold and then fusing the silica powder by use of a vitreous silica crucible manufacturing apparatus including a power supply, a carbon electrode, a carbon mold, a depressurizing mechanism, and the like under the initially set manufacturing condition data. Specifically, a vitreous silica crucible is manufactured by a silica powder layer forming process of forming a silica powder layer by depositing silica powder having an average particle diameter of approx. 300 um on the inner surface of a rotating mold and an arc-fusing process of forming a vitreous silica layer by arc-fusing the silica powder layer while depressurizing the silica powder layer from the mold side.

In this arc-fusing process, initially, a transparent layer is formed by strongly depressurizing the silica powder layer to remove bubbles; and thereafter, a bubble-containing layer where bubbles remains is formed by weakly depressurizing the silica powder layer. Thus, a two-layer vitreous silica crucible including the inner transparent layer and the outer bubble-containing layer is formed.

Thereafter, the three-dimensional shape of this vitreous silica crucible is measured by use of robot arms (to be discussed later). Thus, measurement data of the three-dimensional shape of the vitreous silica crucible is obtained.

Furthermore, assuming that a vitreous silica crucible is manufactured by use of the initially set manufacturing condition data, simulation data of the three-dimensional shape of the vitreous silica crucible is obtained by use of a numerical analysis technique such as stress analysis or thermal fluid analysis. At this time, property parameters (for example, density, permittivity, permeability, magnetic susceptibility, modulus of rigidity, Young's modulus, conductivity, polarizability, hardness, specific heat, coefficient of linear expansion, boiling point, melting point, glass transition point, heat transfer coefficient, Poisson's ratio, and the like) are set to the carbon mold, the natural quartz powder, the synthetic silica powder, the transparent layer, the bubble-containing layer, and the like. Default property parameters included in commercially available simulation software may be set as initial property parameters. Property parameters that a skilled operator or engineer regards as being appropriate based on previously obtained knowledge and experience may also be set as initial property parameters.

Thereafter, the degree of matching between the simulation data and measurement data thus obtained is calculated. If the degree of matching falls below a predetermined level, the property parameters set to the carbon mold, the natural quartz powder, the synthetic silica powder, the transparent layer, the bubble-containing layer, and the like are changed, and a simulation is repeated until this degree of matching becomes higher than or equal to the predetermined level. When this degree of matching becomes higher than or equal to the predetermined level, then the property parameters are employed as improved property parameters. Various kinds of existing pattern matching can be used as an indicator of this degree of matching.

Then the degree of matching between simulation data obtained by use of the improved property parameters and the design data is calculated. If this degree of matching falls below a predetermined level, the vitreous silica crucible manufacturing condition data (for example, a table of arc power, depressurizing conditions, mold rotation speed, and the like) is changed, and a simulation is repeated until this degree of matching becomes higher than or equal to the predetermined level. When the degree of matching becomes higher than or equal to the predetermined level, then the manufacturing condition data is employed as improved manufacturing condition data. Various kinds of existing pattern matching can be used as an indicator of this degree of matching.

As seen above, if the degree of matching between the three-dimensional shapes of the simulation data obtained based on the initial property parameters and the measurement data falls below the predetermined level, property parameters with which the degree of matching becomes higher than or equal to the predetermined level are set as improved property parameter. Thus, the degree of matching between the three-dimensional shapes of the simulation data and the measurement data can be enhanced to the predetermined level or higher. Furthermore, as seen above, manufacturing conditions are set such that simulation data matching the design data to a degree higher than or equal to the predetermined level is obtained. Thus, the degree of matching between the three-dimensional shapes of the design data and the simulation data can be enhanced to the predetermined level or higher. As a result, the degree of matching between the three-dimensional shapes of the design data and measurement data of the vitreous silica crucible can be enhanced to a predetermined level or higher. That is, it is possible to manufacture a vitreous silica crucible by rotational molding in such a manner that the three-dimensional shape thereof matches the design data to a high degree.

FIG. 2 is a conceptual diagram showing that an arc power supply and a depressurizing mechanism are precisely feedback-controlled in a vitreous silica crucible manufacturing process under the improved manufacturing condition data obtained by the apparatus of the present embodiment. As shown in FIG. 2, by using the improved manufacturing condition data obtained by the technique described with reference to FIG. 1, more precise feedback can be performed in the timetable of arc power, depressurizing conditions, mold rotation speed, and the like. As a result, it is possible to manufacture a vitreous silica crucible by rotational molding in such a manner that the three-dimensional shape thereof matches the design data to a high degree.

FIG. 3 is a function block diagram showing the overall configuration of the apparatus of the present embodiment. The apparatus of the present embodiment, that is, a manufacturing condition setting support apparatus 1000 includes a design data acquisition unit 104 that acquires the design data of the three-dimensional shape of a vitreous silica crucible of any model, production lot, or serial number. For example, the design data acquisition unit 104 acquires the design data of the three-dimensional shape of a vitreous silica crucible that a skilled operator or engineer inputs through an operation unit 124. The design data acquisition unit 104 may acquire the design data of the three-dimensional shape of a vitreous silica crucible stored in an outside server 126 through a network 118.

The manufacturing condition setting support apparatus 1000 also includes a manufacturing condition data setting unit 140 that sets a vitreous silica crucible manufacturing condition data on the basis of design data. For example, the manufacturing condition data setting unit 140 sets, as initial manufacturing condition data, vitreous silica crucible manufacturing condition data (for example, a timetable of arc power, depressurizing conditions, mold rotation speed, and the like) that a skilled operator or engineer inputs through the operation unit 124. The manufacturing condition data setting unit 140 may also acquire, through the network 118, manufacturing condition data which is included in past vitreous silica crucible manufacturing records stored in the outside server 126 and under which a predetermined model of vitreous silica crucible showed a good result in a quality inspection.

The manufacturing condition setting support apparatus 1000 also includes a simulation unit 112 that obtains simulation data of the three-dimensional shape of a vitreous silica crucible under the above manufacturing conditions by use of a calculation engine capable of performing one or more kinds of calculation selected from the group consisting of heat transfer calculation, fluid calculation, and structure calculation as well as by use of a numerical analysis technique such as stress analysis or thermal fluid analysis. The manufacturing condition setting support apparatus 1000 also includes a property parameter setting unit 106 that sets property parameters used by the calculation engine of the simulation unit 112. For example, the property parameter setting unit 106 sets, as initial property parameters, property parameters (for example, density, permittivity, permeability, magnetic susceptibility, modulus of rigidity, Young's modulus, conductivity, polarizability, hardness, specific heat, coefficient of linear expansion, boiling point, melting point, glass transition point, heat transfer coefficient, Poisson's ratio, and the like) that a skilled operator or engineer inputs with respect to the carbon mold, the natural quartz powder, the synthetic silica powder, the transparent layer, the bubble-containing layer, and the like. The property parameter setting unit 106 may also acquire property parameters or the like stored in the outside server 126 through the network 118. The property parameter setting unit 106 may also use, as initial property parameters, default property parameters included in commercially available simulation software stored in a property parameter memory 142.

The manufacturing condition setting support apparatus 1000 also includes a measurement data acquisition unit 102 that acquires the measurement data of the three-dimensional shape of a vitreous silica crucible which is actually manufactured under the above manufacturing conditions. For example, the measurement data acquisition unit 102 directly acquires measurement data from a measurement apparatus 128 (to be discussed later) through the network 118. The measurement data acquisition unit 102 may also acquire the measurement data of the three-dimensional shape of a vitreous silica crucible stored in the outside server 126 through the network 118.

The manufacturing condition setting support apparatus 1000 also includes a matching degree judgment unit 114 that makes a comparison between two kinds of data of the design data, the simulation data, and the measurement data and judges the degree of matching between the three-dimensional shapes of the two kinds of data. The matching degree judgment unit 114 is only required to be capable of performing various types of existing pattern matching. Preferred pattern matching techniques include residual matching, normalized correlation, phase-only correlation, geometric matching, vector correlation, and generalized Hough transform.

The manufacturing condition setting support apparatus 1000 also includes an output unit 116 that outputs simulation data or manufacturing condition data. For example, the output unit 116 outputs simulation data or manufacturing condition data as image data through an image display unit 122. The output unit 116 may also output simulation data or manufacturing condition data to an image display unit 130, a printer 132, a server 134 or the like through a network 120.

FIG. 4 is a function block diagram showing the detailed configurations of the simulation unit, the manufacturing condition data setting unit, and the property parameter setting unit of the apparatus of the present embodiment. As shown in FIG. 4, the simulation unit 112 includes a calculation engine memory 210 storing a heat transfer calculation engine 204, a fluid calculation engine 206, a structure calculation engine 208, and the like. The simulation unit 112 also includes an analysis unit 202 that reads the heat transfer calculation engine 204, the fluid calculation engine 206, and the structure calculation engine 208 from the calculation engine memory 210 and then performs numerical analysis such as stress analysis or thermal fluid analysis.

The property parameter setting unit 106 includes an improved property parameter setting unit 402 that, if the degree of matching between the three-dimensional shapes of simulation data obtained based on the initial property parameters and the measurement data falls below a predetermined level, sets improved property parameters such that the degree of matching becomes higher than or equal to the predetermined level. If the degree of matching between the simulation data and the measurement data calculated by the matching degree judgment unit 114 falls below the predetermined level, the matching degree judgment unit 114 issues a property parameter change instruction to the property parameter setting unit 106. The improved property parameter setting unit 402 of the property parameter setting unit 106 receives this change instruction and then changes the property parameters (for example, density, permittivity, permeability, magnetic susceptibility, modulus of rigidity, Young's modulus, conductivity, polarizability, hardness, specific heat, coefficient of linear expansion, boiling point, melting point, glass transition point, heat transfer coefficient, Poisson's ratio, and the like) with respect to the carbon mold, the natural quartz powder, the synthetic silica powder, the transparent layer, the bubble-containing layer, and the like. The improved property parameter setting unit 402 then transmits the changed property parameters, that is, the improved property parameters to the simulation unit 112. The simulation unit 112 receives the improved property parameters, performs a simulation by use of the improved property parameters, and transmits the simulation result to the matching degree judgment unit 114. This series of operations is repeated until the degree of matching becomes higher than or equal to the predetermined level.

The manufacturing condition data setting unit 140 includes an improved manufacturing condition setting unit 308 that sets manufacturing conditions such that simulation data matching the design data to a degree higher than or equal to the predetermined level is obtained. The improved manufacturing condition setting unit 308 includes an arc discharge condition setting unit 302, a rotation speed setting unit 304, and a depressurizing condition setting unit 306. If the degree of matching between the design data and the simulation data calculated by the matching degree judgment unit 114 falls below the predetermined level, the matching degree judgment unit 114 issues a manufacturing condition data change instruction to the manufacturing condition data setting unit 140. The improved manufacturing condition setting unit 308 of the manufacturing condition data setting unit 140 receives the change instruction and then causes the arc discharge condition setting unit 302, the rotation speed setting unit 304, and the depressurizing condition setting unit 306 to change the manufacturing condition data (for example, the timetable of arc power, depressurizing conditions, mold rotation speed, and the like). The improved manufacturing condition setting unit 302 then transmits the changed manufacturing condition data, that is, the improved manufacturing condition data to the simulation unit 112. The simulation unit 112 receives the improved manufacturing condition data, performs a simulation under the improved manufacturing condition data, and transmits the simulation result to the matching degree judgment unit 114. This series of operations is repeated until the degree of matching becomes higher than or equal to the predetermined level.

FIG. 5 is a data table showing the configuration of the measurement data of a vitreous silica crucible used by the apparatus of the present embodiment. For example, the measurement data acquisition unit 102 directly acquires measurement data having a data configuration as shown in FIG. 5 from the measurement apparatus 128 (to be discussed later) through the network 118. In this data table, pieces of measurement data such as inside XYZ coordinates, outside XYZ coordinates, bubble content, FT-IR spectrum, Raman spectrum, and surface roughness are recorded for each of position A, position B, position C, position D, and position E.

FIG. 6 is a flowchart showing the operations of the apparatus of the present embodiment. First, the manufacturing condition setting support apparatus 1000 is powered on to start a series of operations. Then the design data acquisition unit 104 acquires the design data of the three-dimensional shape of a vitreous silica crucible stored in the outside server 126 through the network 118 (S102). Then the manufacturing condition data setting unit 140 acquires, through the network 118, manufacturing condition data which is included in past vitreous silica crucible manufacturing records stored in the outside server 126 and under which a predetermined model of vitreous silica crucible showed a good result in a quality inspection (S104).

Then the property parameter setting unit 106 acquires property parameters or the like stored in the outside server 126 through the network 118 (S106). Then the simulation unit 112 acquires simulation data of the three-dimensional shape of a vitreous silica crucible obtained under the above manufacturing conditions, by use of a numerical analysis technique such as stress analysis or thermal fluid analysis (S108).

On the other hand, a vitreous silica crucible is actually manufactured by depositing silica powder on the mold and then fusing the silica powder by use of the vitreous silica crucible manufacturing apparatus, which includes the power supply, the carbon electrode, the carbon mold, the depressurizing mechanism, and the like, under the manufacturing condition data (S110). Then the measurement data acquisition unit 102 acquires the measurement data of the three-dimensional shape of the vitreous silica crucible, which has been actually manufactured under the above manufacturing conditions (S112).

Then the matching degree judgment unit 114 makes a comparison between the simulation data and measurement data and then judges the degree of matching between the three-dimensional shapes of the two kinds of data (S114). Specifically, the matching degree judgment unit 114 calculates the degree of matching between the simulation data and the measurement data and then judges whether the calculated degree of matching falls below the predetermined level (S116). If the degree of matching between the simulation data and the measurement data falls below the predetermined level, the improved property parameter setting unit 402 sets improved property parameters such that the degree of matching is higher than or equal to the predetermined level (S118). Then the simulation unit 112 performs a simulation again by use of the improved property parameters. In contrast, if the degree of matching between the simulation data and the measurement data is higher than or equal to the predetermined level, then the property parameters are used as they are.

Then the matching degree judgment unit 114 makes a comparison between the design data and the simulation data and then judges the degree of matching between the three-dimensional shapes of the two kinds of data (S120). Specifically, the matching degree judgment unit 114 calculates the degree of matching between the design data and the simulation data and then judges whether the calculated degree of matching falls below the predetermined level (S122). If the degree of matching between the design data and the simulation data falls below the predetermined level, the improved manufacturing condition setting unit 302 sets improved manufacturing condition data such that the degree of matching is higher than or equal to the predetermined level (S124). Then the simulation unit 112 performs a simulation again under the improved manufacturing condition data. In contrast, if the degree of matching between the design data and the simulation data is higher than or equal to the predetermined level, then the manufacturing condition data is used as it is. Then the output unit 116 outputs the simulation data or manufacturing condition data to the image display unit 130, the printer 132, the server 134 or the like through the network 120 (S126), ending the series of operations.

Vitreous Silica Crucible Three-Dimensional Shape Measurement Apparatus

Hereafter, referring to FIGS. 7(a) to 10, there will be described a method for measuring the three-dimensional shape of a vitreous silica crucible to acquire measurement data used in the above embodiment.

Vitreous Silica Crucible

FIGS. 7(a) and (b) are measurement process diagrams showing a method for measuring the three-dimensional shape of a vitreous silica crucible by use of robot arms and distance measuring units in order to acquire measurement data used by the apparatus of the present embodiment. A vitreous silica crucible 11 to be measured includes an inner transparent layer 13 and an outer bubble-containing layer 15. It is placed on a rotatable rotating stage 9 in such a manner that an opening thereof is oriented downward. The vitreous silica crucible 11 also includes a round portion 11b having a relatively large curvature, a cylindrical sidewall 11a having an upward-opening rim, and a mortar-shaped bottom 11c including a straight line or a curve having a relatively small curvature. In the present embodiment, the round portion connects the sidewall 11a and the bottom 11c and refers to a portion between the point at which a tangential line to the curve of the round portion overlaps the sidewall 11a of the vitreous silica crucible and the point at which the round portion has a common tangential line with the bottom 11c. In other words, the point at which the sidewall 11a of the vitreous silica crucible 11 starts to curve is the boundary between the sidewall 11a and the round portion 11b. The portion where the curvature of the crucible bottom is constant is the bottom 11c. The point at which the curvature starts to change when the distance from the center of the crucible bottom is increased is the boundary between the bottom 11c and the round portion 11b.

Inside Robot Arm and Inside Distance Measuring Unit

An inside robot arm 5 is mounted on a base 1 placed in a position covered by the crucible 11. The inside robot arm 5 includes multiple arms 5a, multiple joints 5b that rotatably support the arms 5a, and a main body 5c. The main body 5c is provided with an outside terminal (not shown) so that it can exchange data with the outside. The inside robot arm 5 has, at the front end thereof, an inside distance measuring unit 17 that measures the inner surface shape of the crucible 11. The inside distance measuring unit 17 measures the distance from itself to the inner surface of the crucible 11 by irradiating the inner surface with laser light and then detecting light reflected from the inner surface. The main body 5c includes a controller that controls the joints 5b and the inside distance measuring unit 17. The controller moves the inside distance measuring unit 17 to any three-dimensional position by rotating the joints 5b on the basis of a program installed in the main body 5c or an external input signal to move the robot arm 5. Specifically, the controller moves the inside distance measuring unit 17 along the inner surface of the crucible in a non-contact manner. For this purpose, the controller is previously given rough shape data of the inner surface of the crucible and then moves the inside distance measuring unit 17 on the basis of the data. For example, the controller causes the inside distance measuring unit 17 to start a measurement in a position adjacent to the opening of the crucible 11, as shown in FIG. 7(a), and then to move toward the bottom 11c of the crucible 11 and perform measurements at multiple measurement points on the movement path, as shown in FIG. 7(b). The measurement interval is, for example, 1 to 5 mm and more specifically 2 mm. The inside distance measuring unit 17 performs measurements at a timing which is previously stored in itself, or according to an outside trigger. Each measurement result is stored in a memory of the inside distance measuring unit 17 and, after the measurements are complete, collectively transmitted to the main body 5c, or each time a measurement is performed, the measurement result is transmitted to the main body 5c.

Alternatively, the inside distance measuring unit 17 may be controlled by a controller which is provided independently of the main body 5*c*.

After measurements are performed from the opening to the bottom 11*c* of the crucible, the rotating stage 9 is slightly rotated and then measurements are performed in a similar manner. Alternatively, measurements may be performed from the bottom 11*c* toward the opening. The rotation angle of the rotating stage 9 is determined considering accuracy and measurement time and is, for example, 2 to 10 degrees. Too large a rotation angle makes measurement accuracy insufficient; too small a rotation angle makes measurement time too long. The rotation of the rotating stage 9 is controlled according to the installed program or external input signal. The rotation angle of the rotating stage 9 can be detected by a rotary encoder or the like. Preferably, the rotating stage 9 is rotated in conjunction with the movement of the inside distance measuring unit 17 and an outside distance measuring unit 19 (to be discussed later). Thus, the respective three-dimensional coordinates of the inside distance measuring unit 17 and the outside distance measuring unit 19 are easily calculated.

The inside distance measuring unit 17 can measure both the distance from itself to the inner surface (inner surface distance) and the distance from itself to the interface between the transparent layer 13 and the bubble-containing layer 15 (interface distance). This will be discussed later. Since the angle of each joint 5*b* is detected by a rotary encoder or the like provided on the joint 5*b*, the three-dimensional coordinates of the position of the inside distance measuring unit 17 and the orientation of the inside distance measuring unit 17 at each measurement point are detected. Therefore, by obtaining the inner surface distance and the interface distance, the three-dimensional coordinates on the inner surface and the three-dimensional coordinates on the interface are detected. Since measurements are performed from the opening to the bottom 11*c* of the crucible 11 over the entire circumference of the crucible 11, the three-dimensional shape of the inner surface of the crucible 11, as well as the three-dimensional shape of the interface are detected. Since the distance between the inner surface and the interface is detected, the thickness of the transparent layer 13 is detected. Thus, the three-dimensional distribution of the thickness of the transparent layer is obtained.

Outside Robot Arm and Outside Distance Measuring Unit

An outside robot arm 7 is mounted on a base 3 placed outside the crucible 11. The outside robot arm 7 includes multiple arms 7*a*, multiple joints 7*b* that rotatably support the arms, and a main body 7*c*. The main body 7*c* is provided with an outside terminal (not shown) so that it can exchange data with the outside. The outside robot arm 7 has, at the front end thereof, an outside distance measuring unit 19 that measures the outer surface shape of the crucible 11. The outside distance measuring unit 19 measures the distance from itself to the outer surface of the crucible 11 by irradiating the outer surface with laser light and detecting light reflected from the outer surface. The main body 7*c* includes a controller that controls the joints 7*b* and the outside distance measuring unit 19. The controller moves the outside distance measuring unit 19 to any three-dimensional position by rotating the joints 7*b* on the basis of a program installed in the main body 7*c* or an external input signal to move the arm 7. Specifically, the controller moves the outside distance measuring unit 19 along the outer surface of the crucible in a non-contact manner. For this purpose, the controller is previously given rough shape data of the outer surface of the crucible and then moves the outside distance measuring unit 19 on the basis of the data. For example, the controller causes the outside distance measuring unit 19 to start a measurement in a position adjacent to the opening of the crucible 11, as shown in FIG. 7(*a*), and then to move toward the bottom 11*c* of the crucible 11 and perform measurements at multiple measurement points on the movement path, as shown in FIG. 7(*b*). The measurement interval is, for example, 1 to 5 mm and more specifically 2 mm. Measurements are performed at a timing which is previously stored in the outside distance measuring unit 19, or according to an outside trigger. Each measurement result is stored in a memory of the outside distance measuring unit 19 and, after the measurements are complete, collectively transmitted to the main body 7*c*, or each time a measurement is performed, the measurement result is transmitted to the main body 7*c*. Alternatively, the outside distance measuring unit 19 may be controlled by a controller which is provided independently of the main body 7*c*.

The inside distance measuring unit 17 and the outside distance measuring unit 19 may be moved synchronously, but need not necessarily be synchronized. This is because the inner surface shape and the outer surface shape are independently measured.

As described above, the outside distance measuring unit 19 measures the distance from itself to the outer surface (outer surface distance). Since the angle of each joint 7*b* is detected by a rotary encoder or the like provided on the joint 7*b*, the three-dimensional coordinates of the position of the outside distance measuring unit 19, as well as the orientation of the outside distance measuring unit 19 are detected. Therefore, by obtaining the outer surface distance, the three-dimensional coordinates on the outer surface are detected. Since measurements are performed from the opening to the bottom 11*c* of the crucible 11 over the entire circumference of the crucible 11, the three-dimensional shape of the outer surface of the crucible 11 is detected. In these ways, the three-dimensional shapes of the inner and outer surfaces of the crucible are detected. Thus, the three-dimensional distribution of the wall thickness of the crucible is obtained.

Details of Distance Measurement

Next, referring to FIG. 8, distance measurement performed by the inside distance measuring unit 17 and the outside distance measuring unit 19 will be described in details. As shown in FIG. 8, the inside distance measuring unit 17 is provided adjacent to the inner surface of the crucible 11 (adjacent to the transparent layer 13), and the outside distance measuring unit 19 is provided adjacent to the outer surface of the crucible 11 (adjacent to the bubble-containing layer 15 which contains bubbles 15*a*). The inside distance measuring unit 17 includes an emitter 17*a* and a detector 17*b*. The outside distance measuring unit 19 includes an emitter 19*a* and a detector 19*b*. The inside distance measuring unit 17 and outside distance measuring unit 19 each include a controller (not shown) and an outside terminal (not shown). The emitters 17*a* and 19*a* each emit laser light and include, for example, a semiconductor laser. The type, or wavelength of laser light emitted by these emitters is not limited to a particular one and is, for example, 600 to 700 nm-wavelength red laser light. The detectors 17*b* and 19*b* each include, for example, a CCD. Based on the position of the detector thereof on which light impinges, each distance measuring unit determines the distance therefrom to the target on the basis of the principles of triangulation.

Part of laser light 17*c* emitted from the emitter 17*a* of the inside distance measuring unit 17 is reflected by the inner surface (the surface of the transparent layer 13); another part thereof is reflected by the interface between the transparent layer 13 and the bubble-containing layer 15; and these reflected light parts (inner surface-reflected light 17d, interface-reflected light 17e) impinge on the detector 17b and thus are detected. As is apparent from FIG. 8, the inner surface-reflected light and the interface-reflected light impinge on different positions of the detector 17b. The distance from the inside distance measuring unit 17 to the inner surface (inner surface distance) and the distance from the inside distance measuring unit 17 to the interface (interface distance) are determined based on the difference between these positions. A preferred angle of incidence θ varies depending on the state of the inner surface, the thickness of the transparent layer 13, the state of the bubble-containing layer 15, or the like and is, for example, 30 to 60 degrees.

FIG. 9 shows the results of actual measurements performed by use of a commercially available laser displacement gauge. As shown in FIG. 9, two peaks are observed. A peak on the near side is a peak of the inner surface-reflected light, and a peak on the far side is a peak of the interface-reflected light. As seen above, the peak of the light reflected from the interface between the transparent layer 13 and the bubble-containing layer 15 is also clearly detected. Such a method has never been used to identify the interface, and this result is very novel.

If the distance from the inside distance measuring unit 17 to the inner surface is too long, or if the inner surface or interface is locally inclined, such two peaks may not be observed. In this case, it is preferable to find the position and angle where two peaks are observed, by bringing the inside distance measuring unit 17 close to the inner surface or by inclining the inside distance measuring unit 17 to change the laser light emitting direction. If two peaks are not simultaneously observed, respective peaks of the inner surface-reflected light and interface-reflected light may be observed at different positions and angles. In order to avoid the inside distance measuring unit 17 from contacting the inner surface, it is preferable to previously set the maximum closeness position so that the inside distance measuring unit 17 does not come close to the inner surface beyond the maximum closeness position even when no peak is observed.

If the transparent layer 13 contains a separate bubble, the inside distance measuring unit 17 may detect light reflected from this bubble, failing to properly detect the interface between the transparent layer 13 and the bubble-containing layer 15. That is, the position of the interface measured at one measurement point, A, may be significantly (beyond a predetermined reference value) displaced from the positions of the interface measured at the preceding and following measurement points. In this case, the data at the measurement point A may be removed, or data obtained by performing a measurement again at a position which is slightly shifted from the measurement point A may be employed.

Laser light 19c emitted from the emitter 19a of the outside distance measuring unit 19 is reflected by the outer surface (the surface of the bubble-containing layer 15), and the reflected light (outer surface-reflected light 19d) impinges on the detector 19b and thus is detected. Based on the detection position on the detector 19b, the outside distance measuring unit 19 determines the distance from itself to the outer surface. FIG. 10 shows the results of actual measurements performed by a commercially available laser displacement gauge. As shown in FIG. 4, only one peak is observed. If no peak is observed, it is preferable to find the position and angle where a peak is observed, by bringing the outside distance measuring unit 19 close to the inner surface or by inclining the outside distance measuring unit 19 to change the laser light emitting direction.

The inventors believed that facilitation of the performance improvement and quality control of a crucible required acquisition of three-dimensional shape of the inner surface of the crucible or the three-dimensional distribution data of the thickness of the transparent layer. However, the inventors found that since the crucible was a transparent body, it was difficult to optically measure the three-dimensional shape thereof. The inventors also tried a method of irradiating the inner surface of the crucible with light to acquire an image and analyzing it. However, the inventors found that since the analysis of the image took a very long time, this method could never be used to measure the three-dimensional shape of the entire inner surface of the crucible.

In these circumstances, the inventors diagonally irradiated the inner surface of the crucible with laser light and then found out that it was possible to detect light reflected from the inner surface of the crucible (inner surface-reflected light), as well as light reflected from the interface between the transparent layer and the bubble-containing layer (interface-reflected light). While the interface between the transparent layer and the bubble-containing layer is a surface where bubble content abruptly changes, it is not a clear interface such as the interface between air and glass. For this reason, the fact that it is possible to detect the light reflected from the interface between the transparent layer and the bubble-containing layer was a surprising finding. The apparatus for supporting setting of vitreous silica crucible manufacturing conditions of the present embodiment has been achieved only after the development of the vitreous silica crucible three-dimensional shape measurement apparatus described above.

Characteristic Values Associated with Three-Dimensional Shape of Vitreous Silica Crucible Any of the design data, the simulation data, and the measurement data may include characteristic value data associated with the three-dimensional shape of the vitreous silica crucible. For example, one or more characteristic values selected from bubble content, surface roughness, infrared absorption spectrum, and Raman spectrum may be used as characteristic values, as appropriate.

In this case, the matching degree judgment unit 114 is further configured to judge the degree of matching between the characteristic values of two kinds of data of the design data, the simulation data, and the measurement data. The improved property parameter setting unit 402 is configured to, if the degree of matching between the three-dimensional shapes or characteristic values of the simulation data obtained based on the initial property parameters and the measurement data falls below a corresponding predetermined level, set improved property parameters such that the degree of matching between the three-dimensional shapes and the degree of matching between the characteristic values become higher than or equal to the corresponding predetermined levels. The improved manufacturing condition data setting unit 308 is configured to set manufacturing conditions such that simulation data matching the design data in three-dimensional shape and characteristic value to degrees higher than or equal to the corresponding predetermined levels is obtained.

By considering the three-dimensional shape as well as characteristic values such as bubble content, surface roughness, infrared absorption spectrum, or Raman spectrum as described above, the accuracy of simulations can be enhanced. Thus, it is possible to manufacture a vitreous silica crucible by rotational molding in such a manner that the three-dimensional shape thereof matches the design data to a higher degree.

Method for Determining Three-Dimensional Distribution of Bubbles in Crucible

After the three-dimensional shape of the inner surface of the crucible is obtained, the distribution of bubbles in positions in the crucible wall corresponding to multiple measurement points on this three-dimensional shape is measured. Thus, the three-dimensional distribution of bubbles is determined. The method for measuring the distribution of bubbles in the crucible wall at the measurement points is not limited to a particular one as long as measurements are performed in a non-contact manner. Use of a confocal microscope, which can selectively acquire information from the focal surface, allows acquisition of a clear image from which the position of a bubble can be known, which can make accurate measurements possible. By shifting the focal position, acquiring an image on the surface of each focal position, and merging the images, the three-dimensional positions and sizes of the bubbles can be known. Thus, the distribution of the bubbles can be obtained. Methods for shifting the focal position include (1) movement of the crucible, (2) movement of the probe, and (3) movement of the objective lens of the probe.

The interval between the measurement points is not limited to a particular one. For example, the measurement points are positioned at intervals of 5 to 20 mm in the direction from the opening toward the bottom of the crucible and at intervals of 10 to 60 degrees in the circumferential direction. Measurements are performed, for example, by mounting the probe of a confocal microscope on the front end of the inside robot arm 5 and then moving the probe along the inner surface in a non-contact manner as with the inside distance measuring unit 17. Prior to moving the inside distance measuring unit 17, only a rough three-dimensional shape of the inner surface is known, and any accurate three-dimensional shape thereof is not known. Therefore, the inside distance measuring unit 17 is moved based on the rough three-dimensional shape. Prior to measuring the bubble distribution, on the other hand, an accurate three-dimensional shape of the inner surface is known. Therefore, it is possible to move the probe of the confocal microscope while accurately controlling the distance between the inner surface and the probe.

While the probe of the confocal microscope is moved from the opening to the bottom of the crucible, bubble distribution is measured at multiple points on the movement path. Thereafter, the rotating stage 9 is rotated and then bubble distribution in another portion of the crucible 11 is measured. In this way, it is possible to measure bubble distribution over the entire inner surface of the crucible and to determine the three-dimensional distribution of bubbles in the crucible on the basis of the measurement results.

Method for Determining Three-Dimensional Distribution of Roughness of Inner Surface of Crucible After the three-dimensional shape of the inner surface of the crucible is obtained, the roughness of the inner surface is measured at multiple measurement points on this three-dimensional shape. Thus, the three-dimensional distribution of surface roughness is determined. The method for measuring surface roughness at measurement points is not limited to a particular one as long as measurements are performed in a non-contact manner. Use of a confocal microscope, which can selectively acquire information from the focal surface, allows accurate measurements. Use of a confocal microscope also allows acquisition of detailed three-dimensional structure information of the surface. This information can be used to obtain surface roughness. The kinds of surface roughness include center line average roughness Ra, maximum height Rmax, and ten-point average height Rz, and any of these kinds may be employed. Another parameter representing surface roughness may also be employed. The interval between measurement points and specific measurement method are similar to those in the method for determining the three-dimensional distribution of bubbles in a crucible.

Method for Determining Three-Dimensional Distribution of Infrared Absorption Spectrum on Inner Surface of Crucible After the three-dimensional shape of the inner surface of the crucible is obtained, the infrared absorption spectrum of the inner surface is measured at multiple measurement points on this three-dimensional shape. Thus, the three-dimensional distribution of infrared absorption spectra is determined. The method for measuring an infrared absorption spectrum at measurement points is not limited to a particular one as long as measurements are performed in a non-contact manner. For example, infrared absorption spectra are measured by irradiating the inner surface with infrared light, detecting light reflected from the inner surface, and obtaining the difference between the spectra of the irradiation light and the reflected light.

The interval between measurement points and specific measurement method are similar to those in the method for determining the three-dimensional distribution of bubbles in a crucible.

Method for Determining Three-Dimensional Distribution of Raman Spectrum on Inner Surface of Crucible After the three-dimensional shape of the inner surface of the crucible is obtained, the Raman spectrum of the inner surface is measured at multiple measurement points on this three-dimensional shape. Thus, the three-dimensional distribution of Raman spectra is determined. The method for measuring a Raman spectrum at measurement points is not limited to a particular one as long as measurements are performed in a non-contact manner. For example, Raman spectra are measured by irradiating the inner surface with laser light and then detecting Raman scattering light thereof. The interval between measurement points and specific measurement method are similar to those in the method for determining the three-dimensional distribution of bubbles in a crucible.

Second Embodiment

Apparatus for Supporting Setting of Design Data of Mold for Manufacturing Vitreous Silica Crucible FIG. 11 is a conceptual diagram showing the operating principles of an apparatus of the present embodiment. To set design data of a mold for manufacturing a vitreous silica crucible by use of the apparatus of the present embodiment, first, design data of a vitreous silica crucible is generated by use of a three-dimensional CAD system or the like. This three-dimensional CAD data may be obtained by converting two-dimensional CAD data.

Then, mold design data (for example, mold three-dimensional shape, mold temperature gradient, mold depressurizing piping, or the like) for manufacturing a mold is set based on the design data of the vitreous silica crucible. For example, mold design data that a skilled operator or engineer regards as being appropriate based on previously obtained knowledge and experience may be set as initial mold design data. Alternatively, mold design data which is included in past vitreous silica crucible manufacturing records and based on which a predetermined model of vitreous silica crucible showed a good result in a quality inspection may be used as initial mold design data as it is.

Then, based on the initially set mold design data (three-dimensional CAD data), a carbon mold having a three-dimensional shape approximately matching the mold design data is machined by use of such as a numerically controlled machine tool for cutting or grinding. Since current numerically controlled machine tools have very high machining accuracy, the three-dimensional shape of the machined carbon mold approximately matches the mold design data.

Then, a vitreous silica crucible is manufactured by depositing silica powder (may also be called quartz powder) on this mold and then fusing it. Specifically, a vitreous silica crucible is manufactured by a silica powder layer forming process of forming a silica powder layer by depositing silica powder having an average particle diameter of approx. 300 um on the inner surface of the rotating mold and an arc-fusing process of forming a vitreous silica layer by arc-fusing the silica powder layer while depressurizing the silica powder layer from the mold side. In this arc-fusing process, initially, a transparent layer is formed by strongly depressurizing the silica powder layer to remove bubbles; and thereafter, a bubble-containing layer where bubbles remains is formed by weakly depressurizing the silica powder layer. Thus, a two-layer vitreous silica crucible including the inner transparent layer and the outer bubble-containing layer is formed.

Then the three-dimensional shape of this vitreous silica crucible is measured by use of robot arms. Thus, the measurement data of the three-dimensional shape of the vitreous silica crucible is obtained.

Furthermore, assuming that a vitreous silica crucible is manufactured based on the initially set mold design data, simulation data of the three-dimensional shape of the vitreous silica crucible is obtained by use of a numerical analysis technique such as stress analysis or thermal fluid analysis. At this time, property parameters (for example, density, permittivity, permeability, magnetic susceptibility, modulus of rigidity, Young's modulus, conductivity, polarizability, hardness, specific heat, coefficient of linear expansion, boiling point, melting point, glass transition point, heat transfer coefficient, Poisson's ratio, and the like) are set to the carbon mold, the natural quartz powder, the synthetic silica powder, the transparent layer, the bubble-containing layer, and the like. Default property parameters included in commercially available simulation software may be set as initial property parameters. Property parameters that a skilled operator or engineer regards as being appropriate based on previously obtained knowledge and experience may also be set as initial property parameters.

Thereafter, the degree of matching between the simulation data and measurement data thus obtained is calculated. If the degree of matching falls below a predetermined level, the property parameters set to the carbon mold, the natural quartz powder, the synthetic silica powder, the transparent layer, the bubble-containing layer, and the like are changed, and a simulation is repeated until this degree of matching becomes higher than or equal to the predetermined level. When this degree of matching becomes higher than or equal to the predetermined level, the then property parameters are employed as improved property parameters. Various kinds of existing pattern matching can be used as an indicator of this degree of matching.

Then the degree of matching between simulation data obtained by use of the improved property parameters and the design data is calculated. If the degree of matching falls below the predetermined level, the mold design data for manufacturing a mold (for example, mold three-dimensional shape, mold temperature gradient, mold depressurizing piping, or the like) is changed, and a simulation is repeated until this degree of matching becomes higher than or equal to the predetermined level. When the degree of matching becomes higher than or equal to the predetermined level, the then mold design data is employed as improved mold design data. Various kinds of existing pattern matching can be used as an indicator of this degree of matching.

As seen above, if the degree of matching between the three-dimensional shapes of the simulation data obtained based on the initial property parameters and the measurement data falls below the predetermined level, property parameters with which the degree of matching becomes higher than or equal to the predetermined level are set as improved property parameters. In this way, the degree of matching between the three-dimensional shapes of the simulation data and measurement data can be enhanced to the predetermined level or higher. Furthermore, as seen above, mold design data is set such that simulation data matching the design data to a degree higher than or equal to the predetermined level is obtained. In this way, the degree of matching between the three-dimensional shapes of the design data and the simulation data can be enhanced to the predetermined level or higher. As a result, the degree of matching between the three-dimensional shapes of the design data and measurement data of the vitreous silica crucible can be enhanced to a predetermined level or higher. That is, it is possible to obtain a mold which can manufacture a vitreous silica crucible in such a manner that the three-dimensional shape thereof matches the design data to a high degree.

FIG. 2 is a conceptual diagram showing that a vitreous silica crucible is manufactured by use of the mold manufactured based on the improved design data obtained by use of the apparatus of the present embodiment. Since this conceptual diagram has been described in the first embodiment, it will not be described repeatedly.

FIG. 12 is a function block diagram showing the overall configuration of the apparatus of the present embodiment. The apparatus of the present embodiment, that is, a manufacturing condition setting support apparatus 1000 includes a crucible design data acquisition unit 104 that acquires the design data of the three-dimensional shape of a vitreous silica crucible of any model, manufacturing lot, or serial number. For example, the crucible design data acquisition unit 104 acquires the design data of the three-dimensional shape of a vitreous silica crucible that a skilled operator or engineer inputs through an operation unit 124. The crucible design data acquisition unit 104 may acquire the design data of the three-dimensional shape of a vitreous silica crucible stored in an outside server 126 through a network 118.

The manufacturing condition setting support apparatus 1000 also includes a mold design data setting unit 141 that sets mold design data on the basis of the design data of a vitreous silica crucible. For example, the mold design data setting unit 141 sets, as initial mold design data, mold design data (for example, mold three-dimensional shape, mold temperature gradient, mold depressurizing piping, or the like) that a skilled operator or engineer inputs through the operation unit 124. The mold design data setting unit 141 may also acquire, through the network 118, mold design data which is included in past vitreous silica crucible manufacturing records stored in the outside server 126 and based on which a predetermined model of vitreous silica crucible showed a good result in a quality inspection.

The manufacturing condition setting support apparatus 1000 also includes a simulation unit 112 that acquires simulation data of the three-dimensional shape of a vitreous silica crucible obtained under the above manufacturing conditions, by use of a calculation engine capable of performing one or more kinds of calculation selected from the group consisting of heat transfer calculation, fluid calculation, and structure calculation as well as by use of a numerical analysis technique such as stress analysis or thermal fluid analysis. The manufacturing condition setting support apparatus 1000 also includes a property parameter setting unit 106 that sets property parameters used by the calculation engine of the simulation unit 112. For example, the property parameter setting unit 106 sets, as initial property parameters, property parameters (for example, density, permittivity, permeability, magnetic susceptibility, modulus of rigidity, Young's modulus, conductivity, polarizability, hardness, specific heat, coefficient of linear expansion, boiling point, melting point, glass transition point, heat transfer coefficient, Poisson's ratio, and the like) that a skilled operator or engineer inputs with respect to the carbon mold, the natural quartz powder, the synthetic silica powder, the transparent layer, the bubble-containing layer, and the like. The property parameter setting unit 106 may also acquire property parameters or the like stored in the outside server 126 through the network 118. The property parameter setting unit 106 may also use, as initial property parameters, default property parameters included in commercially available software stored in a property parameter storage unit 142.

The manufacturing condition setting support apparatus 1000 also includes a crucible measurement data acquisition unit 103 that acquires the measurement data of the three-dimensional shape of a vitreous silica crucible which is actually manufactured under the above manufacturing conditions. For example, the crucible measurement data acquisition unit 103 directly acquires measurement data from a measurement apparatus 128 (to be discussed later) through the network 118. The crucible measurement data acquisition unit 103 may also acquire the measurement data of the three-dimensional shape of a vitreous silica crucible stored in the outside server 126 through the network 118.

The manufacturing condition setting support apparatus 1000 also includes a matching degree judgment unit 114 that makes a comparison between two kinds of data of the design data, the simulation data, and the measurement data and judges the degree of matching between the three-dimensional shapes of the two kinds of data. The matching degree judgment unit 114 is only required to be capable of performing various types of existing pattern matching. Preferred pattern matching techniques include residual matching, normalized correlation, phase-only correlation, geometric matching, vector correlation, and generalized Hough transform.

The manufacturing condition setting support apparatus 1000 also includes an output unit 116 that outputs simulation data or mold design data. For example, the output unit 116 outputs simulation data or mold design data as image data through an image display unit 122. The output unit 116 may also output simulation data or mold design data to an image display unit 130, a printer 132, a server 134 or the like through a network 120.

FIG. 13 is a function block diagram showing the detailed configurations of the simulation unit, the mold design data setting unit, and the property parameter setting unit of the apparatus of the present embodiment. As shown in FIG. 13, the simulation unit 112 includes a calculation engine memory 210 storing a heat transfer calculation engine 204, a fluid calculation engine 206, a structure calculation engine 208, and the like. The simulation unit 112 also includes an analysis unit 202 that reads the heat transfer calculation engine 204, the fluid calculation engine 206, and the structure calculation engine 208 from the calculation engine memory 210 and then performs numerical analysis such as stress analysis or thermal fluid analysis.

The property parameter setting unit 106 includes an improved property parameter setting unit 402 that, if the degree of matching between three-dimensional shapes of simulation data obtained based on the initial property parameters and the measurement data falls below a predetermined level, sets improved property parameters such that the degree of matching becomes higher than or equal to the predetermined level. If the degree of matching between the simulation data and the measurement data calculated by the matching degree judgment unit 114 falls below the predetermined level, the matching degree judgment unit 114 issues a property parameter change instruction to the property parameter setting unit 106. The improved property parameter setting unit 402 of the property parameter setting unit 106 receives this change instruction and then changes the property parameters (for example, density, permittivity, permeability, magnetic susceptibility, modulus of rigidity, Young's modulus, conductivity, polarizability, hardness, specific heat, coefficient of linear expansion, boiling point, melting point, glass transition point, heat transfer coefficient, Poisson's ratio, and the like) with respect to the carbon mold, the natural quartz powder, the synthetic silica powder, the transparent layer, the bubble-containing layer, and the like. The improved property parameter setting unit 402 then transmits the changed property parameters, that is, the improved property parameters to the simulation unit 112. The simulation unit 112 receives the improved property parameters, performs a simulation by use of the improved property parameters, and transmits the simulation result to the matching degree judgment unit 114. This series of operations is repeated until the degree of matching becomes higher than or equal to the predetermined level.

The mold design data setting unit 141 includes an improved mold design data setting unit 308 that sets mold design data such that simulation data matching the design data of the vitreous silica crucible to a degree higher than or equal to the predetermined level is obtained. The improved mold design data setting unit 308 includes a mold three-dimensional shape setting unit 303, a mold temperature gradient setting unit 305, and a mold depressurizing piping setting unit 307. If the degree of matching between the design data and simulation data of a vitreous silica crucible calculated by the matching degree judgment unit 114 falls below the predetermined level, the matching degree judgment unit 114 issues a mold design data change instruction to the mold design data setting unit 141. The improved mold design data setting unit 308 of the mold design data setting unit 141 receives the change instruction and causes the mold three-dimensional shape setting unit 303, the mold temperature gradient setting unit 305, and the mold depressurizing piping setting unit 307 to change the mold design data (for example, mold three-dimensional shape, mold temperature gradient, mold depressurizing piping, or the like). The improved mold design data setting unit 141 then transmits the changed mold design data to the improved mold design data outputting unit 310, that is, the improved mold design data to the simulation unit 112 via the improved mold design data outputting unit 310. The simulation unit 112 receives the improved mold design data, performs a simulation by use of the improved mold design data, and transmits the simulation result to the matching degree judgment unit 114. This series of operations is repeated until the degree of matching becomes higher than or equal to the predetermined level.

The configuration of the measurement data of a vitreous silica crucible used by the apparatus of the present embodiment is similar to that in the first embodiment and shown in FIG. 5 in the form of a data table. For this reason, description thereof is omitted.

FIG. 14 is a flowchart showing the operations of the apparatus of the present embodiment. First, the manufacturing condition setting support apparatus 1000 is powered on to start a series of operations. Then the design data acquisition unit 104 acquires the design data of the three-dimensional shape of a vitreous silica crucible stored in the outside server 126 through the network 118 (S102). Then the crucible design data setting unit 141 acquires, through the network 118, crucible design data which is included in past vitreous silica crucible manufacturing records stored in the outside server 126 and based on which a predetermined model of vitreous silica crucible showed a good result in a quality inspection (S104).

Then the property parameter setting unit 106 acquires property parameters or the like stored in the outside server 126 through the network 118 (S106). Then the simulation unit 112 acquires simulation data of the three-dimensional shape of a vitreous silica crucible obtained based on the crucible design data, by use of a numerical analysis technique such as stress analysis or thermal fluid analysis (S108).

On the other hand, a vitreous silica crucible is actually manufactured by depositing silica powder on a carbon mold manufactured based on the crucible design data and then fusing the silica powder by use of a vitreous silica crucible manufacturing apparatus including a power supply, a carbon electrode, a depressurizing mechanism, and the like (S110). Then the measurement data acquisition unit 102 acquires the measurement data of the three-dimensional shape of the vitreous silica crucible (S112).

Then the matching degree judgment unit 114 makes a comparison between the simulation data and the measurement data and then judges the degree of matching between the three-dimensional shapes of the two kinds of data (S114). Specifically, the matching degree judgment unit 114 calculates the degree of matching between the simulation data and the measurement data and then judges whether the calculated degree of matching falls below the predetermined level (S116). If the degree of matching between the simulation data and the measurement data falls below the predetermined level, the improved property parameter setting unit 402 sets improved property parameters such that the degree of matching is higher than or equal to the predetermined level (S118). Then the simulation unit 112 performs a simulation again by use of the improved property parameters. In contrast, if the degree of matching between the simulation data and the measurement data is higher than or equal to the predetermined level, the then property parameters are used as they are.

Then the matching degree judgment unit 114 makes a comparison between the design data and the simulation data and then judges the degree of matching between the three-dimensional shapes of the two kinds of data (S120). Specifically, the matching degree judgment unit 114 calculates the degree of matching between the design data and the simulation data and then judges whether the calculated degree of matching falls below the predetermined level (S122). If the degree of matching between the design data and the simulation data falls below the predetermined level, the improved crucible design data setting unit 302 sets improved crucible design data such that the degree of matching is higher than or equal to the predetermined level (S124). Then the simulation unit 112 performs a simulation again by use of the improved crucible design data. In contrast, if the degree of matching between the design data and the simulation data is higher than or equal to the predetermined level, the then crucible design data is used as it is. Then the output unit 116 outputs the simulation data or mold design data to the image display unit 130, the printer 132, the server 134 or the like through the network 120 (S126), ending the series of operations.

Vitreous Silica Crucible Three-Dimensional Shape Measurement Apparatus

The method for measuring the three-dimensional shape of a vitreous silica crucible to acquire measurement data used in the present embodiment is similar to that in the first embodiment and shown in FIGS. 7(a) to 10. Therefore, description thereof is omitted Third Embodiment Apparatus for Supporting Setting of Conditions Under which Silicon Single Crystal is Pulled by Use of Vitreous Silica Crucible FIG. 15 is a conceptual diagram showing the operating principles of an apparatus of the present embodiment. In the present embodiment, first, a vitreous silica crucible is manufactured by depositing silica powder (may also be called quartz powder) on a mold and then fusing the silica powder by use of a vitreous silica crucible manufacturing apparatus including a power supply, a carbon electrode, a carbon mold, a depressurizing mechanism, and the like. Specifically, a vitreous silica crucible is manufactured by a silica powder layer forming process of forming a silica powder layer by depositing silica powder having an average particle diameter of approx. 300 um on the inner surface of a rotating mold and an arc-fusing process of forming a vitreous silica layer by arc-fusing the silica powder layer while depressurizing the silica powder layer from the mold side.

In this arc-fusing process, initially, a transparent layer is formed by strongly depressurizing the silica powder layer to remove bubbles; and thereafter, a bubble-containing layer where bubbles remains is formed by weakly depressurizing the silica powder layer. Thus, a two-layer vitreous silica crucible including the inner transparent layer and the outer bubble-containing layer is formed.

Then, the three-dimensional shape of this vitreous silica crucible is measured by use of robot arms. Thus, the measurement data of the three-dimensional shape of the vitreous silica crucible is obtained.

Then, the measurement data of the three-dimensional shape of this vitreous silica crucible is provided in accordance with a request from the user.

Then, assuming that a silicon single crystal is pulled by the Czochralski method by use of a vitreous silica crucible having a three-dimensional shape according to the measurement data, the incidence of a crystal defect is simulated. Based on the simulation result, pulling conditions are set such that the incidence of a crystal defect becomes equal to or lower than a predetermined level, and then provided to the user. As a result, the user can easily set single-crystal silicon pulling conditions which are suitable for properties of individual vitreous silica crucibles.

FIGS. 16(a) and 16(b) are conceptual diagrams showing that the user properly charges and fuses a polycrystalline silicon raw material in a single-crystal silicon pulling process by use of the measurement data of the three-dimensional shape of the vitreous silica crucible obtained by use of the apparatus of the present embodiment. In the silicon single crystal pulling process, first, polycrystalline silicon 21 is charged into a crucible 11, as shown in FIG. 16(a), and then heated and fused by use of a carbon heater provided around the crucible 11 to give a silicon melt 23, as shown in FIG. 16(b).

Since the volume of the silicon melt 23 is determined by the mass of the polycrystalline silicon 21, the height H of a surface 23a of the silicon melt 23 is determined by the mass of the polycrystalline silicon 21 and the three-dimensional shape of the inner surface of the crucible 11. Since the measurement data of the three-dimensional shape of the inner surface of the crucible 11 is provided in the present embodiment, the volume of the crucible 11 reaching any height is identified. Therefore, the height H of the surface 23a of the silicon melt 23 is determined. After the height H of the initial surface of the silicon melt 23 is determined, an end of a seed crystal is lowered to the height H so that the end contacts the silicon melt 23, and then slowly pulled. In this way, a silicon single crystal is manufactured.

FIGS. 17(a) to 17(c) are conceptual diagrams showing that the user more precisely feedback-controls heating temperature, pulling speed and rotation speed in the single-crystal silicon pulling process under the pulling condition data obtained by use of the apparatus of the present embodiment. In this silicon single crystal pulling process, the polycrystalline silicon 21 is charged into the crucible 11 and then heated and fused by use of a carbon heater provided around the crucible 1 to give a silicon melt 23, as shown in FIG. 17(a).

Since the volume of the silicon melt 23 is determined by the mass of the polycrystalline silicon 21, the initial height H0 of the surface 23a of the silicon melt 23 is determined by the mass of the polycrystalline silicon 21 and the three-dimensional shape of the inner surface of the crucible 11. Since the measurement data of the three-dimensional shape of the inner surface of the crucible 11 is provided in the present embodiment, the volume of the crucible 11 reaching any height is identified. Therefore, the initial height H0 of the surface 23a of the silicon melt 23 is determined.

After the initial height H0 of the surface 23a of the silicon melt 23 is determined, the end of the seed crystal 24 is lowered to the height H0 so that the end contacts the silicon melt 23, as shown in FIG. 17(a), and then slowly pulled under the pulling conditions provided in the present embodiment, including heating temperature, pulling speed, and rotation speed. Thus, a silicon single crystal 25 is pulled.

As shown in FIG. 17(b), when the melt surface 23a is located on a sidewall 11a of the crucible 11, if the straight body portion (the portion having a constant diameter) of the silicon single crystal 25 is pulled at a constant speed under the pulling conditions provided in the present embodiment, including heating temperature, pulling speed, and rotation speed, the fall speed V of the melt surface 23a becomes approximately constant. That is, it is easy to control the pulling.

However, as shown in FIG. 17(c), after the melt surface 23a reaches a round portion 11b of the crucible 11, the area of the melt surface 23a abruptly decreases as the melt surface 23a falls. Thus, the fall speed V of the melt surface 23a abruptly increases. While the fall speed V depends on the inner surface shape of the round portion 11b, this inner surface shape slightly varies among crucibles. For this reason, it is difficult to previously know how the fall speed V will change, which prevents automation of pulling.

In the present embodiment, the three-dimensional shape of the inner surface of the crucible is accurately measured using a method (to be discussed later). Thus, it is possible to previously know the inner surface shape of the round portion 11b (data on the unevenness of the round portion) and thus to predict how the fall speed V will change. Therefore, by determining pulling conditions, including the pulling speed of the silicon single crystal 25, on the basis of this prediction and providing the pulling conditions to the user, it is possible to prevent occurrence of dislocations even on the round portion 11b and to automate the pulling.

FIG. 18 is a function block diagram showing the overall configuration of the apparatus of the present embodiment. The apparatus of the present embodiment, that is, a manufacturing condition setting support apparatus 1000 includes a crucible identifying information acquisition unit 140 that acquires crucible identifying information which the user inputs and by which a vitreous silica crucible can be identified. The crucible identifying information acquisition unit 140 may acquire, through the Internet 150 and a LAN 118, information by which a vitreous silica crucible can be identified, such as the model, production lot, or serial number of the vitreous silica crucible, which the user inputs through a user terminal 152.

The manufacturing condition setting support apparatus 1000 also includes a measurement data acquisition unit 103 that acquires the measurement data of the three-dimensional shape of a vitreous silica crucible identified by the crucible identifying information. The measurement data acquisition unit 102 may also acquire the measurement data of the three-dimensional shape of a vitreous silica crucible stored in an outside server 126 through the LAN 118.

The manufacturing condition setting support apparatus 1000 also includes a simulation unit 112 that, assuming that a silicon single crystal is pulled by use of a vitreous silica crucible having a three-dimensional shape according to the measurement data, obtains simulation data of the incidence of a crystal defect by use of a calculation engine capable of performing one or more kinds of calculation selected from the group consisting of heat transfer calculation, fluid calculation, and structure calculation.

The manufacturing condition setting support apparatus 1000 also includes a pulling condition setting unit 115 that sets pulling conditions used by the simulation unit 112, including heating temperature, pulling speed, and rotation speed, and, when simulation data of the incidence of a crystal defect obtained based on the initial pulling conditions exceeds a predetermined level, sets improved pulling conditions such that the incidence of a crystal defect becomes equal to or lower than the predetermined level.

The manufacturing condition setting support apparatus 1000 also includes an output unit 116 that outputs the pulling conditions. The output unit 116 may output the measurement data of the three-dimensional shape of a vitreous silica crucible or silicon single crystal pulling conditions to the user terminal 152 through the LAN 118 and the Internet 150.

FIG. 19 is a function block diagram showing the detailed configurations of the simulation unit and the pulling condition setting unit of the apparatus of the present embodiment. As shown in FIG. 19, the simulation unit 112 includes a calculation engine memory 210 storing a heat transfer calculation engine 204, a fluid calculation engine 206, a structure calculation engine 208, and the like. The simulation unit 112 also includes an analysis unit 202 that reads the heat transfer calculation engine 204, the fluid calculation engine 206, and the structure calculation engine 208 from the calculation engine memory 210 and then performs numerical analysis such as stress analysis or thermal fluid analysis.

The simulation unit 112 also includes a crystal defect prediction unit 106 that, assuming that a silicon single crystal is pulled by use of a vitreous silica crucible having a three-dimensional shape according to the measurement data, predicts the incidence of a crystal defect by use of a calculation engine capable of performing one or more kinds of calculation selected from the group consisting of heat transfer calculation, fluid calculation, and structure calculation. The crystal defect prediction unit 106 includes a crystal structure calculation unit 402 that, assuming that a silicon single crystal is pulled by use of a vitreous silica crucible having a three-dimensional shape according to the measurement data, simulates a crystal structure by use of a calculation engine capable of performing one or more kinds of calculation selected from the group consisting of heat transfer calculation, fluid calculation, and structure calculation. The simulation unit 112 also includes a threshold memory 404 that is storing a predetermined level (threshold) which the incidence of a crystal defect must not exceed.

On the other hand, the pulling condition setting unit 115 includes a default pulling condition setting unit 311 that sets pulling conditions used by the simulation unit 112, including heating temperature, pulling speed, and rotation speed, as default pulling conditions. The default pulling condition setting unit 311 reads, from a default memory 312, default pulling conditions which are typically used when that model of the vitreous silica crucible is used. The pulling condition setting unit 115 includes an improved pulling condition setting unit 328 that, when simulation data of the incidence of a crystal defect obtained under the initial pulling conditions exceeds the predetermined level (threshold) stored in the threshold memory 404, sets improved pulling conditions such that the incidence of a crystal defect becomes equal to or lower than the predetermined level. The improved pulling condition setting unit 328 includes a heating temperature setting unit 322, a pulling speed setting unit 324, a rotation speed setting unit 326 that set heating temperature, pulling speed, and rotation speed, respectively, included in the pulling conditions used by the simulation unit 112. If the incidence of a crystal defect exceeds the predetermined level under the default pulling conditions, the improved pulling condition setting unit 328 considers the measurement data of the three-dimensional shape of the vitreous silica crucible and additional information (to be discussed later) and then sets improved pulling conditions such that the incidence of a crystal defect becomes equal to or lower than the predetermined level.

Referring back to FIG. 18, the manufacturing condition setting support apparatus 1000 also includes an additional information acquisition unit 105 that acquires one or more kinds of additional information inputted by the user which are selected from the group consisting of a polycrystalline silicon raw material, the diameter of the pulling apparatus (or the name of the manufacturer of the pulling apparatus, series name, or the like), the strength of a magnetic field to be applied (including an input on whether a magnetic field exists), the size and length of a silicon single crystal to be pulled, heating method (high-frequency induction, carbon heater, or the like), the kind of an atmospheric gas (argon, nitrogen, hydrogen gas, or the like), the degree to depressurization of an atmospheric gas, continuous pulling conditions, additional raw material charging conditions, and storage conditions (weather conditions, storage period, or the like). Note that the weather conditions are important information, since the humidity and temperature work on stored crucibles (clacks expand). The additional information acquisition unit 104 may acquire, through the Internet 150 and the LAN 118, these kinds of additional information that the user inputs through the user terminal 152.

If, assuming that a silicon single crystal is pulled, the simulation unit 112 predicts the incidence of a crystal defect considering these kinds of additional information, the accuracy of the simulations is further improved. For this purpose, the pulling condition setting unit 115 may set more suitable pulling conditions. Thus, the user can more easily set single-crystal silicon pulling conditions which are suitable for properties of individual vitreous silica crucibles.

The configuration of the measurement data of a vitreous silica crucible used by the apparatus of the present embodiment is similar to that in the first embodiment and shown in FIG. 5 in the form of a data table. For this reason, description thereof is omitted.

FIG. 20 is a flowchart showing the operations of the apparatus of the present embodiment. First, the manufacturing condition setting support apparatus 1000 is powered on to start a series of operations.

Then the crucible identifying information acquisition unit 105 acquires, through the Internet 150 and the LAN 118, information by which a vitreous silica crucible can be identified, such as the model, production lot, or serial number of the vitreous silica crucible, which the user inputs through the user terminal 152 (S103). Then the measurement data acquisition unit 102 acquires the measurement data of the three-dimensional shape of a vitreous silica crucible stored in the outside server 126 through the LAN 118 (S105).

On the other hand, the additional information acquisition unit 105 acquires, through the Internet 150 and the LAN 118, additional information, such as a crystalline silicon raw material, the diameter of the pulling apparatus, the strength of a magnetic field to be applied, the size and length of a silicon single crystal to be pulled, heating method, the kind of an atmospheric gas, the degree to depressurization of an atmospheric gas, continuous pulling conditions, additional raw material charging conditions, and storage conditions, which the user inputs through the user terminal 152 (S107).

Then, assuming that a silicon single crystal is pulled by use of a vitreous silica crucible having a three-dimensional shape according to the measurement data, the simulation unit 112 obtains simulation data of the incidence of a crystal defect by use of a calculation engine capable of performing one or more kinds of calculation selected from the group consisting of heat transfer calculation, fluid calculation, and structure calculation (S109).

Then the pulling condition setting unit 115 sets pulling conditions used by the simulation unit 112, including heating temperature, pulling speed, and rotation speed, and judges whether the simulation data of the incidence of a crystal defect obtained under the initial pulling conditions exceeds the predetermined level (S111). If the simulated incidence of a crystal defect exceeds the predetermined level, the pulling condition setting unit 115 sets improved pulling conditions such that the incidence of a crystal defect becomes equal to or lower than the predetermined level (S113). In contrast, if the simulated incidence of a crystal defect becomes equal to or lower than the predetermined level, the pulling condition setting unit 115 uses the initial pulling conditions as they are.

Then the output unit 116 outputs the measurement data of the three-dimensional shape of the vitreous silica crucible or the silicon single crystal pulling conditions to the user terminal 152 through the LAN 118 and the Internet 150 (S115), ending the series of operations.

Vitreous Silica Crucible Three-Dimensional Shape Measurement Apparatus

A method for measuring the three-dimensional shape of a vitreous silica crucible to acquire measurement data used in the present embodiment is similar to that in the first embodiment and shown in FIGS. 7(*a*) to 10. For this reason, description thereof is omitted.

The invention claimed is:

1. An apparatus for supporting setting of a manufacturing condition of a vitreous silica crucible, comprising;
   a design data acquisition unit configured to acquire design data of a three-dimensional shape of the vitreous silica crucible of any model, production lot, or serial number;
   a manufacturing condition data setting unit configured to set manufacturing condition data of the vitreous silica crucible on a basis of the design data;
   a simulation unit configured to obtain simulation data of the three-dimensional shape of the vitreous silica crucible obtained under the manufacturing condition data, by use of a calculation engine capable of performing one or more kinds of calculation selected from the group consisting of heat transfer calculation, fluid calculation, and structure calculation;
   a property parameter setting unit configured to set a property parameter used by the calculation engine;
   a measurement data acquisition unit configured to acquire measurement data of the three-dimensional shape of the vitreous silica crucible manufactured under the manufacturing condition data;
   a pattern matching computing unit to compare two types of data selected from the design data, the simulation data, and the measurement data and to judge a degree of matching between three-dimensional shapes of the selected two types of data; and
   an output unit configured to output the simulation data or the manufacturing condition data,
   wherein the property parameter setting unit comprises an improved property parameter computing unit configured to, if the degree of matching between the three-dimensional shape of the simulation data obtained based on an initial property parameter and the three-dimensional shape of the measurement data falls below a predetermined level, set an improved property parameter by changing the property parameter until a degree of matching between the three-dimensional shape of the simulation data obtained based on the changed property parameter and the three-dimensional shape of the measurement data becomes higher than or equal to the predetermined level, and
   wherein the manufacturing condition data setting unit comprises an improved manufacturing condition data setting unit configured to set a manufacturing condition by changing the manufacturing condition data until the three-dimensional shape of the simulation data obtained using the changed manufacturing condition data matches the three-dimensional shape of the design data to a degree higher than or equal to a predetermined level.

2. The apparatus of claim 1, wherein the simulation unit is configured to be capable of performing stress analysis or thermal fluid analysis by use of the calculation engine.

3. The apparatus of claim 1,
   wherein the design data, the simulation data, and the measurement data each comprise characteristic value data associated with the three-dimensional shape of the vitreous silica crucible,
   wherein the pattern matching computing unit is further configured to judge a degree of matching between characteristic values of the selected two types of data,
   wherein the improved property parameter computing unit is configured to, if the degree of matching between the three-dimensional shape of the simulation data obtained based on the initial property parameter and the three-dimensional shape of the measurement data falls below the predetermined level, and if the degree of matching between the characteristic value of the simulation data obtained based on the initial property parameter and the characteristic value of the measurement data falls below another predetermined level, set an improved property parameter by changing the property parameter until a degree of matching between the three-dimensional shapes of the simulation data obtained using the changed property parameter and the measurement data, and a degree of matching between the characteristic values of the simulation data obtained using the changed property parameter and the measurement data become higher than or equal to the predetermined level and the other predetermined level, respectively, and
   wherein the improved manufacturing condition data setting unit is configured to set a manufacturing condition by changing the manufacturing condition data until the three-dimensional shape and characteristic value of the simulation data obtained using the changed manufacturing condition data match the three-dimensional shape and characteristic value of the design data to degrees higher than or equal to a predetermined level and another predetermined level, respectively.

4. The apparatus of claim 3, wherein the characteristic value data comprises one or more of: bubble content, surface roughness, infrared absorption spectrum, and Raman spectrum.

5. An apparatus for supporting setting of a manufacturing condition of a mold for manufacturing a vitreous silica crucible, the apparatus comprising;
   a crucible design data acquisition unit configured to acquire design data of a three-dimensional shape of the vitreous silica crucible of any model, production lot, or serial number;
   a mold design data setting unit configured to set design data of a three-dimensional shape of the mold on a basis of the crucible design data;
   a simulation unit configured to obtain simulation data of the three-dimensional shape of the vitreous silica crucible by use of a calculation engine capable of performing one or more kinds of: heat transfer calculation, fluid calculation, and structure calculation, the vitreous silica crucible being obtained by arc-fusing silica powder on the mold having the three-dimensional shape according to the mold design data;
   a property parameter setting unit configured to set a property parameter used by the calculation engine;
   a crucible measurement data acquisition unit configured to acquire crucible measurement data of the three-dimensional shape of the vitreous silica crucible obtained by arc-fusing silica powder on the mold manufactured based on the mold design data;

a pattern matching computing unit to compare two types of data selected from the crucible design data, the simulation data, and the crucible measurement data, and to judge a degree of matching between three-dimensional shapes of the selected two types of data; and an output unit configured to output the simulation data or the mold design data, wherein the property parameter setting unit comprises an improved property parameter setting unit configured to, if the degree of matching between the three-dimensional shape of the simulation data obtained based on an initial property parameter and the three-dimensional shape of the crucible measurement data falls below a predetermined level, set an improved property parameter by changing the property parameter until a degree of matching between the three-dimensional shape of the simulation data obtained based on the changed property parameter and the three-dimensional shape of the crucible measurement data becomes higher than or equal to the predetermined level, and wherein the mold design data setting unit comprises an improved mold design data setting unit configured to set an improved mold design data by changing the mold design data until the three-dimensional shape of the simulation data obtained using the changed mold design data matches the three-dimensional shape of the crucible design data to a degree higher than or equal to a predetermined level.

6. The apparatus of claim 5, wherein the simulation unit is configured to be capable of performing stress analysis or thermal fluid analysis by use of the calculation engine.

7. The apparatus of claim 5, wherein the crucible design data, the simulation data, and the crucible measurement data each comprise characteristic value data associated with the three-dimensional shape of the vitreous silica crucible, wherein the pattern matching computing unit is further configured to judge a degree of matching between characteristic values of the selected two types of data, wherein the improved property parameter setting unit is configured to, if the degree of matching between the three-dimensional shape of the simulation data obtained based on the initial property parameter and the three-dimensional shape of the crucible measurement data falls below the predetermined level, and if the degree of matching between the characteristic values of the simulation data obtained based on the initial property parameter and the characteristic values of the crucible measurement data falls below another predetermined level, set an improved property parameter by changing the property parameter until a degree of matching between the three-dimensional shapes of the simulation data obtained using the changed property parameter and the crucible measurement data and a degree of matching between the characteristic values of the simulation data obtained using the changed property parameter and the crucible measurement data become higher than or equal to the predetermined level and the other predetermined level, respectively, and wherein the improved mold design data setting unit is configured to, when the improved property parameter is used, set an improved mold design data by changing the mold design data until the three-dimensional shape and characteristic value of the simulation data obtained using the changed mold design data matches three-dimensional shape and characteristic value of the crucible design data to degrees higher than or equal to a predetermined level and another predetermined level, respectively.

8. The apparatus of claim 7, wherein the characteristic value data comprises one or more of: bubble content, surface roughness, infrared absorption spectrum, and Raman spectrum.

9. An apparatus for supporting setting of a condition under which a silicon single crystal is pulled by use of a vitreous silica crucible, the apparatus comprising:

a crucible identifying information storing unit configured to store crucible identifying information by which the vitreous silica crucible can be identified, the crucible identifying information being inputted by a user;

a measurement data acquisition unit configured to acquire measurement data of a three-dimensional shape of the vitreous silica crucible identified by the crucible identifying information;

a simulation unit configured to, assuming that the silicon single crystal is pulled by use of the vitreous silica crucible having the three-dimensional shape according to the measurement data, obtain simulation data of an incidence of a crystal defect by use of a calculation engine capable of performing one or more kinds of calculation selected from the group consisting of heat transfer calculation, fluid calculation, and structure calculation;

a pulling condition setting unit configured to set pulling conditions used by the simulation unit, which pulling conditions comprising heating temperature, pulling speed, and rotation speed and to, if the simulation data of the incidence of the crystal defect obtained based on initial pulling conditions exceeds a predetermined level, set an improved pulling conditions by changing the pulling conditions until an incidence of the a crystal defect obtained based on the changed pulling conditions becomes equal to or lower than the predetermined level; and an output unit configured to output the changed pulling conditions.

10. The apparatus of claim 9, wherein the simulation unit is configured to be capable of performing stress analysis or thermal fluid analysis by use of the calculation engine.

11. The apparatus of claim 9, wherein the measurement data comprises characteristic value data associated with the three-dimensional shape of the vitreous silica crucible, and wherein the simulation unit is configured to, assuming that the silicon single crystal is pulled by use of the vitreous silica crucible having the three-dimensional shape and a characteristic value according to the measurement data, obtain the simulation data of the incidence of the crystal defect.

12. The apparatus of claim 11, wherein the characteristic value data comprises one or more of: bubble content, surface roughness, infrared absorption spectrum, and Raman spectrum.

13. The apparatus of claim 9, wherein the measurement data comprises data on unevenness of a round portion of the vitreous silica crucible, and wherein the pulling conditions comprise a time table of pulling speed, heating temperature, and rotation speed around the round portion.

14. The apparatus of claim 9, further comprising an additional information storing unit configured to store one or more kinds of additional information selected from the group consisting of a polycrystalline silicon raw material, a diameter of a pulling apparatus, strength of a magnetic field to be applied, a size and length of the silicon single crystal to be pulled, a heating method, a kind of an atmospheric gas, a degree of depressurization of the atmospheric gas, a continuous pulling condition, an additional raw material charging condition, and a storage condition, the one or more kinds of additional information being inputted by a user.

15. The apparatus of claim 9, wherein the output unit is further configured to output the measurement data.

\* \* \* \* \*